US010981046B2

(12) United States Patent
Karafin et al.

(10) Patent No.: US 10,981,046 B2
(45) Date of Patent: Apr. 20, 2021

(54) LIGHT FIELD DISPLAY SYSTEM FOR SPORTING EVENTS

(71) Applicant: Light Field Lab, Inc., San Jose, CA (US)

(72) Inventors: Jonathan Sean Karafin, Morgan Hill, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 16/630,258

(22) PCT Filed: Aug. 26, 2019

(86) PCT No.: PCT/US2019/048143
§ 371 (c)(1),
(2) Date: Jan. 10, 2020

(65) Prior Publication Data

US 2021/0060405 A1 Mar. 4, 2021

(51) Int. Cl.
*A63B 71/00* (2006.01)
*A63B 71/06* (2006.01)
(Continued)

(52) U.S. Cl.
CPC .......... *A63B 71/0622* (2013.01); *G02B 30/56* (2020.01); *G03H 1/0005* (2013.01);
(Continued)

(58) Field of Classification Search
None
See application file for complete search history.

(56) References Cited

U.S. PATENT DOCUMENTS 5,187,360 A 2/1993 Pasco
5,374,976 A 12/1994 Spannenburg
(Continued)

FOREIGN PATENT DOCUMENTS

WO WO 2006/058412 A1 6/2006
WO WO 2014/188149 A1 11/2014
(Continued)

OTHER PUBLICATIONS

PCT International Search Report and Written Opinion, PCT Application No. PCT/US17/42275, dated Dec. 4, 2017, 21 pages.
(Continued)

*Primary Examiner* — Seng H Lim

(57) ABSTRACT

A light field (LF) display system for displaying holographic content (e.g., a holographic sporting event or holographic content to augment a holographic sporting event) to viewers in an arena. The LF display system in the arena includes LF display modules tiled together to form an array of LF modules. The array of LF modules create a holographic object volume for displaying the holographic content in the arena. The array of LF modules displays the holographic content to viewers in the viewing volumes. The LF display system can be included in a LF sporting event network. The LF sporting event network allows holographic content to be created at one location and presented at another location. The LF sporting event network includes a network system to manage the digital rights of the holographic sporting event content.

29 Claims, 16 Drawing Sheets

(51) Int. Cl.

| | |
|---|---|
| ***G03H 1/00*** | (2006.01) |
| ***H04N 13/302*** | (2018.01) |
| ***H04N 19/20*** | (2014.01) |
| ***G02B 30/56*** | (2020.01) |

(52) U.S. Cl.

CPC ........... *H04N 13/302* (2018.05); *H04N 19/20* (2014.11); *A63B 2071/0625* (2013.01); *A63B 2071/0636* (2013.01); *A63B 2071/0655* (2013.01); *G03H 2001/0088* (2013.01); *G03H 2226/04* (2013.01)

(56) References Cited

U.S. PATENT DOCUMENTS

| | | | |
|---|---|---|---|
| 5,481,385 | A | 1/1996 | Zimmerman et al. |
| 5,822,125 | A | 10/1998 | Meyers |
| 6,556,280 | B1 | 4/2003 | Kelsey et al. |
| 6,680,761 | B1 | 1/2004 | Greene et al. |
| 7,329,982 | B2 | 2/2008 | Conner et al. |
| 8,442,397 | B2 | 5/2013 | Kang et al. |
| 8,743,466 | B2 | 6/2014 | Yamamoto |
| 8,786,925 | B2 | 7/2014 | Hart et al. |
| 8,953,012 | B2 | 2/2015 | Williams et al. |
| 9,179,134 | B2 | 11/2015 | Ranieri et al. |
| 9,652,897 | B2 | 5/2017 | Osborn et al. |
| 2003/0030912 | A1 | 2/2003 | Gleckman et al. |
| 2004/0108806 | A1 | 6/2004 | Cok et al. |
| 2004/0135100 | A1 | 7/2004 | Menon et al. |
| 2005/0243275 | A1 | 11/2005 | Curatu |
| 2005/0260677 | A1 | 11/2005 | Saaski |
| 2006/0191566 | A1 | 8/2006 | Schaafsma |
| 2008/0192313 | A1 | 8/2008 | Matsumura et al. |
| 2010/0073468 | A1 | 3/2010 | Kutner |
| 2010/0278480 | A1 | 11/2010 | Vasylyev |
| 2011/0032329 | A1 | 2/2011 | Bauza et al. |
| 2011/0119595 | A1 | 5/2011 | Bydeley et al. |
| 2011/0134040 | A1 | 6/2011 | Duparre et al. |
| 2012/0057040 | A1 | 3/2012 | Park et al. |
| 2012/0206726 | A1 | 8/2012 | Pervez et al. |
| 2012/0268950 | A1 | 10/2012 | Parkyn et al. |
| 2012/0300044 | A1 | 11/2012 | Thomas et al. |
| 2013/0027512 | A1 | 1/2013 | Aronsson et al. |
| 2013/0127980 | A1 | 5/2013 | Haddick et al. |
| 2013/0163089 | A1 | 6/2013 | Bohn |
| 2013/0195410 | A1 | 8/2013 | Karbasivalashani et al. |
| 2013/0216123 | A1 | 8/2013 | Shroff et al. |
| 2013/0265485 | A1 | 10/2013 | Kang |
| 2013/0278727 | A1 | 10/2013 | Tamir et al. |
| 2014/0126322 | A1 | 5/2014 | Cipolla et al. |
| 2014/0132694 | A1 | 5/2014 | Shacham et al. |
| 2014/0267598 | A1* | 9/2014 | Drouin ................. G03H 1/2294 348/40 |
| 2014/0282008 | A1 | 9/2014 | Verard et al. |
| 2014/0320530 | A1* | 10/2014 | Gruber, Jr. .............. G06T 15/50 345/633 |
| 2014/0371353 | A1 | 12/2014 | Mitchell et al. |
| 2015/0016777 | A1 | 1/2015 | Abovitz et al. |
| 2015/0070467 | A1 | 3/2015 | Crowder et al. |
| 2015/0124051 | A1* | 5/2015 | Schinker ................. H04L 51/18 348/40 |
| 2015/0142536 | A1 | 5/2015 | Marlow et al. |
| 2015/0178939 | A1 | 6/2015 | Bradski et al. |
| 2015/0219940 | A1 | 8/2015 | Kim et al. |
| 2015/0241608 | A1 | 8/2015 | Shian et al. |
| 2015/0271541 | A1 | 9/2015 | Gonder et al. |
| 2015/0331241 | A1 | 11/2015 | Haddick |
| 2016/0014395 | A1 | 1/2016 | Murray et al. |
| 2016/0037146 | A1 | 2/2016 | McGrew |
| 2016/0070059 | A1 | 3/2016 | Chen et al. |
| 2016/0180511 | A1 | 6/2016 | Zhou et al. |
| 2016/0205394 | A1 | 7/2016 | Meng et al. |
| 2017/0102671 | A1 | 4/2017 | Damm et al. |
| 2019/0114485 | A1* | 4/2019 | Chan .................. H04N 21/4223 |
| 2019/0271943 | A1* | 9/2019 | Bezirganyan ...... G02B 27/0103 |
| 2020/0023254 | A1* | 1/2020 | Lalaoua .................. G09F 19/18 |
| 2020/0254311 | A1* | 8/2020 | Watterson ............ A63B 22/025 |
| 2020/0296327 | A1* | 9/2020 | Karafin .................. H04N 7/157 |

FOREIGN PATENT DOCUMENTS

| | | | |
|---|---|---|---|
| WO | WO 2016/046514 | A1 | 3/2016 |
| WO | WO 2018/014009 | A1 | 1/2018 |
| WO | WO 2018/014010 | A1 | 1/2018 |
| WO | WO 2018/014027 | A1 | 1/2018 |
| WO | WO 2018/014036 | A1 | 1/2018 |
| WO | WO 2018/014040 | A1 | 1/2018 |
| WO | WO 2018/014044 | A1 | 1/2018 |
| WO | WO 2018/014045 | A2 | 1/2018 |
| WO | WO 2018/014046 | A1 | 1/2018 |
| WO | WO 2018/014047 | A1 | 1/2018 |
| WO | WO 2018/014048 | A2 | 1/2018 |
| WO | WO 2018/014049 | A1 | 1/2018 |

OTHER PUBLICATIONS

PCT International Search Report and Written Opinion, PCT Application No. PCT/US17/42276, dated Nov. 24, 2017, 14 pages.

PCT International Search Report and Written Opinion, PCT Application No. PCT/US17/42418, dated Dec. 20, 2017, 11 pages.

PCT International Search Report and Written Opinion, PCT Application No. PCT/US17/42452, dated Nov. 17, 2017, ten pages.

PCT International Search Report and Written Opinion, PCT Application No. PCT/US17/42462, dated Oct. 30, 2017, eight pages.

PCT International Search Report and Written Opinion, PCT Application No. PCT/US17/42466, dated Nov. 28, 2017, 12 pages.

PCT International Search Report and Written Opinion, PCT Application No. PCT/US17/42467, dated Dec. 27, 2017, seven pages.

PCT International Search Report and Written Opinion, PCT Application No. PCT/US17/42468, dated Nov. 27, 2017, 11 pages.

PCT International Search Report and Written Opinion, PCT Application No. PCT/US17/42469, dated Oct. 12, 2017, ten pages.

PCT International Search Report and Written Opinion, PCT Application No. PCT/US17/42470, dated Dec. 28, 2017, 18 pages.

PCT International Search Report and Written Opinion, PCT Application No. PCT/US17/42679, dated Nov. 9, 2017, eight pages.

Wetzstein, G. et al., "On Plenoptic Multiplexing and Reconstruction," International Journal on Computer Vistion (IJCV), vol. 101, No. 2, Nov. 5, 2013, pp. 384-400.

PCT International Search Report and Written Opinion, PCT Application No. PCT/US2019/048143, dated Nov. 8, 2019, 31 pages.

"Technical Report of the Joint Ad Hoc Group for Digital Representations of Light/Sound Fields for Immersive Media Applications," International Organisation for Standardisation, ISO/IEC JTC1/SC29/WG11N16352, Jun. 2016, Geneva, Switzerland, 79 pages, [Online] [Retrieved on Oct. 17, 2019] Retrieved from the Internet<URL:http:mpeg.chiariglione.org/sites/default/filed/filed/standards/part/docs/w16352_2016-06-03_Report_JAhG_light-sound_fields.pdf>.

* cited by examiner

LIGHT FIELD DISPLAY SYSTEM FOR SPORTING EVENTS

CROSS REFERENCE TO RELATED APPLICATIONS

This application is related to International Application Nos. PCT/US2017/042275, PCT/US2017/042276, PCT/US2017/042418, PCT/US2017/042452, PCT/US2017/042462, PCT/US2017/042466, PCT/US2017/042467, PCT/US2017/042468, PCT/US2017/042469, PCT/US2017/042470, and PCT/US2017/042679, all of which are incorporated by reference herein in their entirety.

BACKGROUND

The present disclosure relates to presenting sporting events in an arena, and specifically relates to light field display systems for presenting sporting events in an arena.

Traditionally, arenas (e.g., baseball stadiums, basketball arenas, etc.) are configured to allow viewers (e.g., fans, crowds, patrons, etc.) attending the area to view a sporting event (e.g., a baseball game, a tennis match, etc.) in real-time. Unfortunately, in some cases, hosting a sporting event in an arena limits the ability of a viewer who wants to view the sporting event from doing so. For example, the sporting event may be sold out, may be at an inconvenient time, or may be located far from the viewer. Sometimes sporting events are recorded and, subsequently, reproduced on two-dimensional surfaces such as movie screens or televisions, but these reproductions hardly reproduce the atmosphere and excitement present in an arena of a live sporting event. As such, presentation spaces configured to present sporting events such that viewers can perceive the sporting event as if they were at the live sporting event in an arena would be beneficial.

SUMMARY

A light field (LF) display system for displaying holographic content of a sporting event in a presentation space (e.g., an area, a home theater, a public venue such as a bar, etc.). The LF display system includes LF display modules that form a surface (e.g., a court, a floor, a table-top, etc.) in the presentation space, the LF display modules each have a display area and are tiled together to form a seamless display surface that has an effective display area that is larger than the display area. The LF display modules display holographic content of a sporting event from a sporting volume such that viewers in the presentation space can perceive the sporting event.

In some embodiments, the holographic content of a sporting event may be a reproduction of a sporting event occurring concurrently at another presentation space, created for display in the presentation space by a content creation system, and/or accessed for display in the presentation space from a data store. The holographic content can be managed by a network system responsible for managing the digital rights of the holographic content. For example, viewers in the presentation space may pay a transaction fee to access holographic content for display in the presentation space.

In some embodiments, the LF display system includes a tracking system and/or a viewer profiling system. The tracking system and profiling system can monitor and store characteristics of viewers in the presentation space, a viewer profile describing a viewer, and/or responses of viewers to the holographic content in the presentation space. The holographic content created for display in a presentation space can be based on any of the monitored or stored information.

In some embodiments, a user may interact with the holographic content, and the interaction can act as input for the holographic content creation system. For example, in some embodiments, some or all of the LF display system includes a plurality of ultrasonic speakers. The plurality of ultrasonic speakers are configured to generate a haptic surface that coincides with at least a portion of the holographic content. The tracking system is configured to track an interaction of a user with the holographic object (e.g., via images captured by imaging sensors of the LF display modules and/or some other cameras). And the LF display system is configured to provide to create holographic content based on the interaction.

Figure 1:
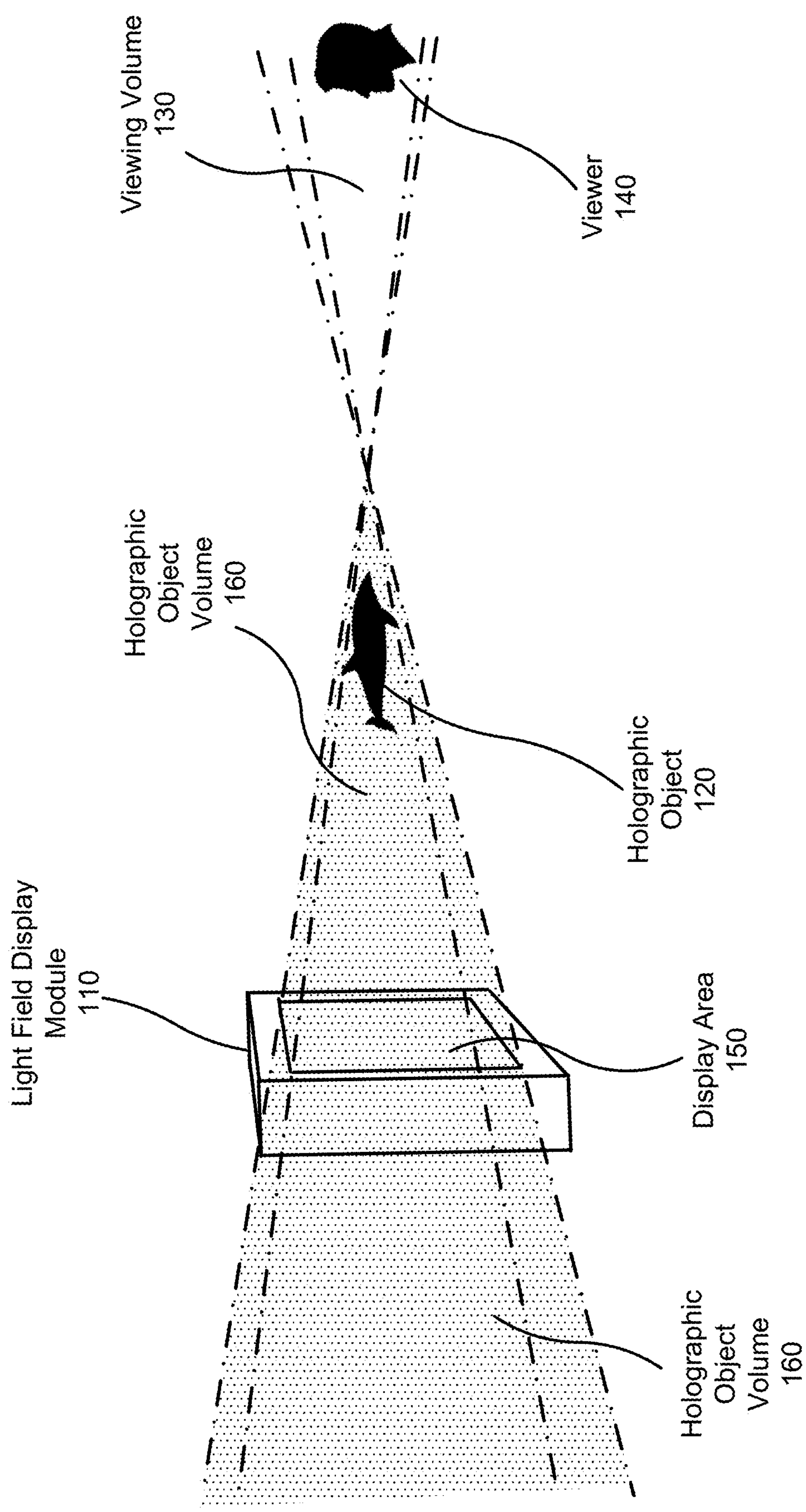
FIG. 1 is a diagram of a light field display module presenting a holographic object, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A light field (LF) display system is implemented in a presentation space that acts as a setting for a sporting event. For example, a sporting event may be a baseball game, a basketball game a hockey game, a gymnastics event, a cricket match, a field hockey game, a table tennis game, a rugby match, a golf game, a track and field meet, a football game, a soccer game, a car racing event, a tennis match, a boxing match, a martial arts bout, an Olympics event, and a world championship event. The LF display system comprises a LF display assembly configured to present holographic content including one or more holographic objects that would be visible to one or more viewers in a viewing volume of the LF display system. The holographic objects may be sporting content and may include a coach, a player, an official, a medical professional, a fan, or a participant. A LF display assembly may form a multi-sided seamless surface over some or all of one or more surfaces (e.g., a court) in the presentation space. The LF display system can present holographic content to viewers in the presentation space. A viewer generally attends a sporting event at the presentation space, but may be any person in a location that can view the holographic content in the presentation space.

A holographic object of the holographic content may also be augmented with other sensory stimuli (e.g., tactile and/or audio). For example, ultrasonic emitters in the LF display system may emit ultrasonic pressure waves that provide a tactile surface for some or all of the holographic object. Holographic content may include additional visual content (i.e., 2D or 3D visual content). The coordination of emitters to ensure that a cohesive experience is enabled is part of the system in multi-emitter implementations (i.e., holographic objects providing the correct haptic feel and sensory stimuli at any given point in time.)

In some embodiments, the LF display system includes a plurality of LF display modules that form a sporting display area (e.g., a court, a field, a table-top, etc.) in the presentation space. The LF display modules forming the sporting display area may be configured to project holographic content of a sporting event to viewers in the viewing volume of the LF display within the presentation space. In this disclosure, it is assumed that a 'viewer in the presentation space' refers to a viewer in one of the viewing volumes of the LF display system within the presentation space. Viewing volumes are described in greater detail below. In this manner, a viewer in the presentation space can perceive a holographic sporting event on the sporting display area. For example, the LF display system may display two combatants in a martial arts bout, two teams playing a basketball game, two players in a tennis match, or any other content associated with a sporting event. In some embodiments, the LF display system may create holographic content for display to viewers in the presentation space. For example, the LF display system may create a cheering section in the presentation space that cheers for one of the teams participating in the presented sporting event. In an embodiment, the presentation space reproduces a portion of a sporting arena. For example, the LF display within the presentation space may generate sporting content representing a portion of a stadium or arena (e.g. a hockey ice rink and a portion of the audience), a field, a court, a gymnasium, or a portion of an amphitheater. In an embodiment, the presentation space may be located in an arena itself, or may be located at a bar, a home entertainment system, a table-top presentation system, or a public presentation system.

In some embodiments, the LF display system may include elements that enable the system to simultaneously emit at least one type of energy, and, simultaneously, absorb at least one type of energy (for creating holographic content). For example, a LF display system can emit both holographic objects for viewing as well as ultrasonic waves for haptic perception. Simultaneously, the LF display system can absorb both imaging information for tracking of viewers and other scene analysis and ultrasonic waves to detect touch response by the users. As an example, such a system may project a holographic ball that is thrown into the audience in the presentation space. When the holographic ball is virtually "touched" by a viewer, the LF display system gives the viewer the illusion that the ball is in their hands. The display system components that perform energy sensing of the environment may be integrated into the display surface via bidirectional energy elements that both emit and absorb energy, or they may be dedicated sensors that are separate from the display surface. For example, the LF display system may include dedicated ultrasonic speakers and image capture devices.

The LF display system can be part of a LF sporting event network. The LF sporting event network allows LF data to be recorded in one location (e.g., a first arena), encoded, transmitted to a different location (e.g., a second arena), decoded, and displayed as holographic content to viewers in a presentation space in the different location. This allows viewers in multiple locations to perceive a live-sporting event occurring in a different location. In some embodiments, the LF display system includes a network system that manages the digital rights of the holographic content.

Light Field Display System

FIG. 1 is a diagram 100 of a light field (LF) display module 110 presenting a holographic object 120, in accordance with one or more embodiments. The LF display module 110 is part of a light field (LF) display system. The LF display system presents holographic content including at least one holographic object using one or more LF display modules. The LF display system can present holographic content to one or multiple viewers. In some embodiments, the LF display system may also augment the holographic content with other sensory content (e.g., touch, audio, smell, temperature, etc.). For example, as discussed below, the projection of focused ultrasonic sound waves may generate a mid-air tactile sensation that can simulate a surface of some or all of a holographic object. The LF display system includes one or more LF display modules 110, and is discussed in detail below with regard to FIGS. 2-4.

The LF display module 110 is a holographic display that presents holographic objects (e.g., the holographic object 120) to one or more viewers (e.g., viewer 140). The LF display module 110 includes an energy device layer (e.g., an emissive electronic display or acoustic projection device) and an energy waveguide layer (e.g., an optical lens array).

Additionally, the LF display module 110 may include an energy relay layer for combining multiple energy sources or detectors together to form a single surface. At a high-level, the energy device layer generates energy (e.g., holographic content) that is then directed using the energy waveguide layer to a region in space in accordance with one or more four-dimensional (4D) light field functions. The LF display module 110 may also project and/or sense one or more types of energy simultaneously. For example, LF display module 110 may be able to project a holographic image as well as an ultrasonic tactile surface in a viewing volume, while simultaneously detecting imaging data from the viewing volume. The operation of the LF display module 110 is discussed in more detail below with regard to FIGS. 2-3.

The LF display module 110 generates holographic objects within a holographic object volume 160 using one or more 4D light field functions (e.g., derived from a plenoptic function). The holographic objects can be three-dimensional (3D), two-dimensional (2D), or some combination thereof. Moreover, the holographic objects may be polychromatic (e.g., full color). The holographic objects may be projected in front of the screen plane, behind the screen plane, or split by the screen plane. A holographic object 120 can be presented such that it is perceived anywhere within the holographic object volume 160. A holographic object within the holographic object volume 160 may appear to a viewer 140 to be floating in space.

A holographic object volume 160 represents a volume in which holographic objects may be perceived by a viewer 140. The holographic object volume 160 can extend in front of the surface of the display area 150 (i.e., towards the viewer 140) such that holographic objects can be presented in front of the plane of the display area 150. Additionally, the holographic object volume 160 can extend behind the surface of the display area 150 (i.e., away from the viewer 140), allowing for holographic objects to be presented as if they are behind the plane of the display area 150. In other words, the holographic object volume 160 may include all the rays of light that originate (e.g., are projected) from a display area 150 and can converge to create a holographic object. Herein, light rays may converge at a point that is in front of the display surface, at the display surface, or behind the display surface. More simply, the holographic object volume 160 encompasses all of the volume from which a holographic object may be perceived by a viewer.

A viewing volume 130 is a volume of space from which holographic objects (e.g., holographic object 120) presented within a holographic object volume 160 by the LF display system are fully viewable. The holographic objects may be presented within the holographic object volume 160, and viewed within a viewing volume 130, such that they are indistinguishable from actual objects. A holographic object is formed by projecting the same light rays that would be generated from the surface of the object were it physically present.

In some cases, the holographic object volume 160 and the corresponding viewing volume 130 may be relatively small—such that it is designed for a single viewer, as described in detail below with regard to FIGS. 10 and 11. In other embodiments, the LF display modules may be enlarged and/or tiled to create larger holographic object volumes and corresponding viewing volumes that can accommodate a large range of viewers (e.g., 1 to thousands), as described in detail below with regard to, e.g., FIGS. 4A-4F, 6A-6B, 7A-7B, 8, and 9A-9B. The LF display modules presented in this disclosure may be built so that the full surface of the LF display contains holographic imaging optics, with no inactive or dead space, and without any need for bezels. In these embodiments, the LF display modules may be tiled so that the imaging area is continuous across the seam between LF display modules, and the connection points between the tiled modules is virtually undetectable using the visual acuity of the eye. Notably, in some configurations, some portion of the display surface may not include holographic imaging optics, although they are not described in detail herein.

The flexible size and/or shape of a viewing volume 130 allows for viewers to be unconstrained within the viewing volume 130. For example, a viewer 140 can move to a different position within a viewing volume 130 and see a different view of the holographic object 120 from the corresponding perspective. To illustrate, referring to FIG. 1, the viewer 140 is at a first position relative to the holographic object 120 such that the holographic object 120 appears to be a head-on view of a dolphin. The viewer 140 may move to other locations relative to the holographic object 120 to see different views of the dolphin. For example, the viewer 140 may move such that he/she sees a left side of the dolphin, a right side of the dolphin, etc., much like if the viewer 140 was looking at an actual dolphin and changed his/her relative position to the actual dolphin to see different views of the dolphin. In some embodiments, the holographic object 120 is visible to all viewers within the viewing volume 130 that have an unobstructed line (i.e., not blocked by an object/person) of sight to the holographic object 120. These viewers may be unconstrained such that they can move around within the viewing volume to see different perspectives of the holographic object 120. Accordingly, the LF display system may present holographic objects such that a plurality of unconstrained viewers may simultaneously see different perspectives of the holographic objects in real-world space as if the holographic objects were physically present.

In contrast, conventional displays (e.g., stereoscopic, virtual reality, augmented reality, or mixed reality) generally require each viewer to wear some sort of external device (e.g., 3-D glasses, a near-eye display, or a head-mounted display) to see content. Additionally and/or alternatively, conventional displays may require that a viewer be constrained to a particular viewing position (e.g., in a chair that has fixed location relative to the display). For example, when viewing an object shown by a stereoscopic display, a viewer always focuses on the display surface, rather than on the object, and the display will always present just two views of an object that will follow a viewer who attempts to move around that perceived object, causing distortions in the perception of that object. With a light field display, however, viewers of a holographic object presented by the LF display system do not need to wear an external device, nor be confined to a particular position, in order to see the holographic object. The LF display system presents the holographic object in a manner that is visible to viewers in much the same way a physical object would be visible to the viewers, with no requirement of special eyewear, glasses, or a head-mounted accessory. Further, the viewer may view holographic content from any location within a viewing volume.

Notably, potential locations for holographic objects within the holographic object volume 160 are limited by the size of the volume. To increase the size of the holographic object volume 160, a size of a display area 150 of the LF display module 110 may be increased, and/or multiple LF display modules may be tiled together in a manner that forms a seamless display surface. The seamless display surface has an effective display area that is larger than the display areas of the individual LF display modules. Some embodiments relating to tiling LF display modules are discussed below with regard to FIGS. 4A-4F, 6A-6B, 7A-7B, 8, and 9A-9B. As illustrated in FIG. 1, the display area 150 is, for example, rectangular resulting in a holographic object volume 160 that is a pyramid. In other embodiments, the display area may have some other shape (e.g., hexagonal), which also affects the shape of the corresponding viewing volume.

Additionally, while the above discussion focuses on presenting the holographic object 120 within a portion of the holographic object volume 160 that is between the LF display module 110 and the viewer 140, the LF display module 110 can additionally present content in the holographic object volume 160 behind the plane of the display area 150. For example, the LF display module 110 may make the display area 150 appear to be a surface of the ocean that the holographic object 120 is jumping out of And the displayed content may be such that the viewer 140 is able to look through the displayed surface to see marine life that is under the water. Moreover, the LF display system can generate content that seamlessly moves around the holographic object volume 160, including behind and in front of the plane of the display area 150.

Figure 2A:
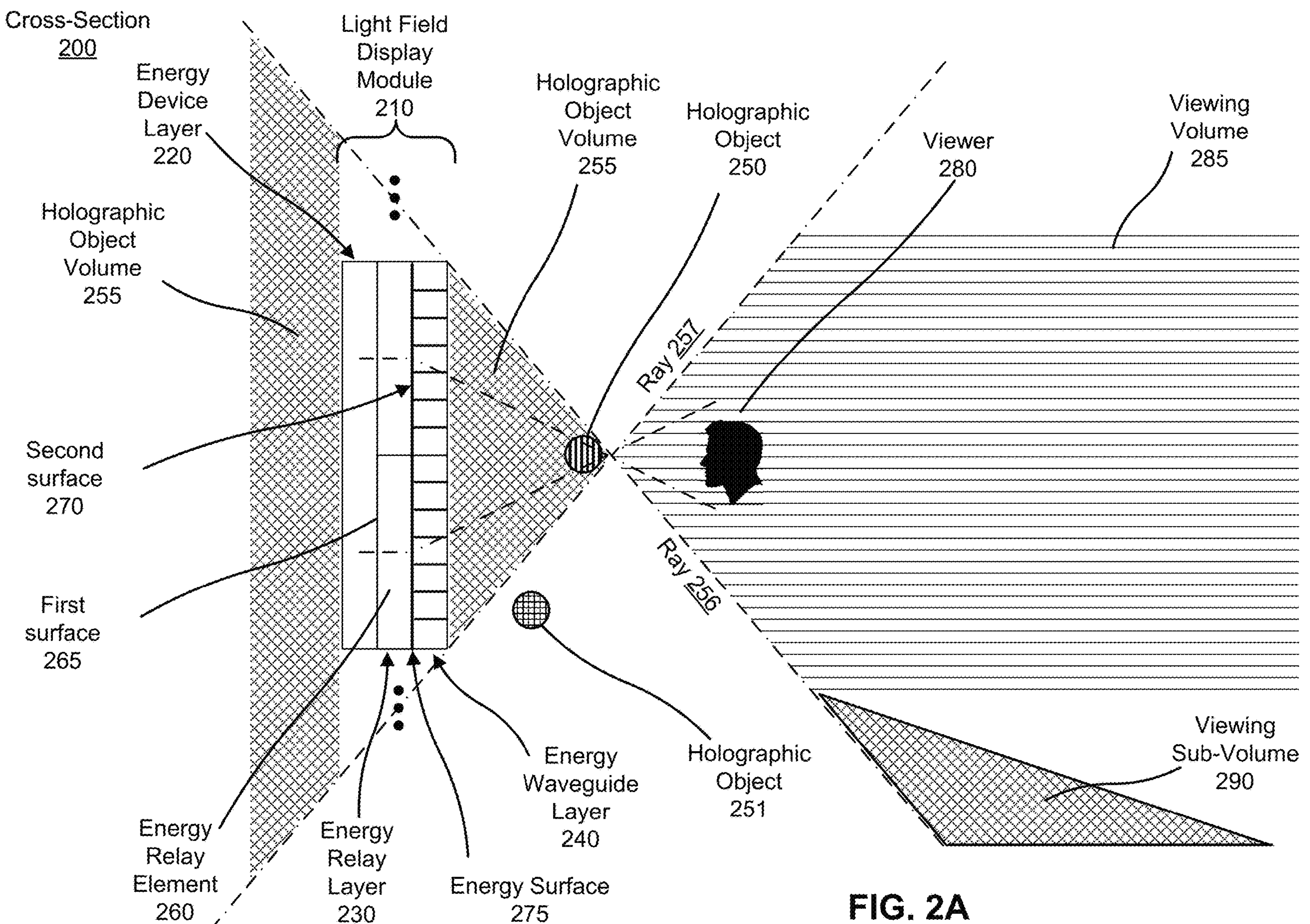
FIG. 2A is a cross section of a portion of a light field display module, in accordance with one or more embodiments.

FIG. 2A illustrates a cross section 200 of a portion of a LF display module 210, in accordance with one or more embodiments. The LF display module 210 may be the LF display module 110. In other embodiments, the LF display module 210 may be another LF display module with a different display area shape than display area 150. In the illustrated embodiment, the LF display module 210 includes an energy device layer 220, an energy relay layer 230, and an energy waveguide layer 240. Some embodiments of the LF display module 210 have different components than those described here. For example, in some embodiments, the LF display module 210 does not include the energy relay layer 230. Similarly, the functions can be distributed among the components in a different manner than is described here.

The display system described here presents an emission of energy that replicates the energy normally surrounding an object in the real world. Here, emitted energy is directed towards a specific direction from every coordinate on the display surface. In other words, the various coordinates on the display surface act as projection locations for emitted energy. The directed energy from the display surface enables convergence of many rays of energy, which, thereby, can create holographic objects. For visible light, for example, the LF display will project a very large number of light rays from the projection locations that may converge at any point in the holographic object volume so they will appear to come from the surface of a real-world object located in this region of space from the perspective of a viewer that is located further away than the object being projected. In this way, the LF display is generating the rays of reflected light that would leave such an object's surface from the perspective of the viewer. The viewer perspective may change on any given holographic object, and the viewer will see a different view of that holographic object.

The energy device layer 220 includes one or more electronic displays (e.g., an emissive display such as an OLED) and one or more other energy projection and/or energy receiving devices as described herein. The one or more electronic displays are configured to display content in accordance with display instructions (e.g., from a controller of a LF display system). The one or more electronic displays include a plurality of pixels, each with an intensity that is individually controlled. Many types of commercial displays, such as emissive LED and OLED displays, may be used in the LF display.

The energy device layer 220 may also include one or more acoustic projection devices and/or one or more acoustic receiving devices. An acoustic projection device generates one or more pressure waves that complement the holographic object 250. The generated pressure waves may be, e.g., audible, ultrasonic, or some combination thereof. An array of ultrasonic pressure waves may be used for volumetric tactile sensation (e.g., at a surface of the holographic object 250). An audible pressure wave is used for providing audio content (e.g., immersive audio) that can complement the holographic object 250. For example, assuming the holographic object 250 is a dolphin, one or more acoustic projection devices may be used to (1) generate a tactile surface that is collocated with a surface of the dolphin such that viewers may touch the holographic object 250; and (2) provide audio content corresponding to noises a dolphin makes such as clicks, chirping, or chatter. An acoustic receiving device (e.g., a microphone or microphone array) may be configured to monitor ultrasonic and/or audible pressure waves within a local area of the LF display module 210.

The energy device layer 220 may also include one or more imaging sensors. An imaging sensor may be sensitive to light in a visible optical band, and in some cases may be sensitive to light in other bands (e.g., infrared). The imaging sensor may be, e.g., a complementary metal oxide semiconductor (CMOS) array, a charged coupled device (CCD), an array of photodetectors, some other sensor that captures light, or some combination thereof. The LF display system may use data captured by the one or more imaging sensor for position location tracking of viewers.

In some configurations, the energy relay layer 230 relays energy (e.g., electromagnetic energy, mechanical pressure waves, etc.) between the energy device layer 220 and the energy waveguide layer 240. The energy relay layer 230 includes one or more energy relay elements 260. Each energy relay element includes a first surface 265 and a second surface 270, and it relays energy between the two surfaces. The first surface 265 of each energy relay element may be coupled to one or more energy devices (e.g., electronic display or acoustic projection device). An energy relay element may be composed of, e.g., glass, carbon, optical fiber, optical film, plastic, polymer, or some combination thereof. Additionally, in some embodiments, an energy relay element may adjust magnification (increase or decrease) of energy passing between the first surface 265 and the second surface 270. If the relay offers magnification, then the relay may take the form of an array of bonded tapered relays, called tapers, where the area of one end of the taper may be substantially larger than the opposite end. The large end of the tapers can be bonded together to form a seamless energy surface 275. One advantage is that space is created on the multiple small ends of each taper to accommodate the mechanical envelope of multiple energy sources, such as the bezels of multiple displays. This extra room allows the energy sources to be placed side-by-side on the small taper side, with each energy source having their active areas directing energy into the small taper surface and relayed to the large seamless energy surface. Another advantage to using tapered relays is that there is no non-imaging dead space on the combined seamless energy surface formed by the large end of the tapers. No border or bezel exists, and so the seamless energy surfaces can then be tiled together to form a larger surface with virtually no seams according to the visual acuity of the eye.

The second surfaces of adjacent energy relay elements come together to form an energy surface 275. In some embodiments, a separation between edges of adjacent energy relay elements is less than a minimum perceptible contour as defined by a visual acuity of a human eye having, for example, 20/40 vision, such that the energy surface 275 is effectively seamless from the perspective of a viewer 280 within a viewing volume 285.

In some embodiments, the second surfaces of adjacent energy relay elements are fused together with processing steps that may include one or more of pressure, heat, and a chemical reaction, in such a way no seam exists between them. And still in other embodiments, an array of energy relay elements is formed by molding one side of a continuous block of relay material into an array of small taper ends, each configured to transport energy from an energy device attached to the small tapered end into a single combined surface with a larger area which is never subdivided.

In some embodiments, one or more of the energy relay elements exhibit energy localization, where the energy transport efficiency in the longitudinal direction substantially normal to the surfaces 265 and 270 is much higher than the transport efficiency in the perpendicular transverse plane, and where the energy density is highly localized in this transverse plane as the energy wave propagates between surface 265 and surface 270. This localization of energy allows an energy distribution, such as an image, to be efficiency relayed between these surfaces without any significant loss in resolution.

The energy waveguide layer 240 directs energy from a location (e.g., a coordinate) on the energy surface 275 into a specific energy propagation path outward from the display surface into the holographic viewing volume 285 using waveguide elements in the energy waveguide layer 240. The energy propagation path is defined by two angular dimensions determined at least by the energy surface coordinate location relative to the waveguide. The waveguide is associated with a spatial 2D coordinate. Together, these four coordinates form a four-dimensional (4D) energy field. As an example, for electromagnetic energy, the waveguide elements in the energy waveguide layer 240 direct light from positions on the seamless energy surface 275 along different propagation directions through the viewing volume 285. In various examples, the light is directed in accordance with a 4D light field function to form the holographic object 250 within the holographic object volume 255.

Each waveguide element in the energy waveguide layer 240 may be, for example, a lenslet composed of one or more elements. In some configurations, the lenslet may be a positive lens. The positive lens may have a surface profile that is spherical, aspherical, or freeform. Additionally, in some embodiments, some or all of the waveguide elements may include one or more additional optical components. An additional optical component may be, e.g., an energy-inhibiting structure such as a baffle, a positive lens, a negative lens, a spherical lens, an aspherical lens, a freeform lens, a liquid crystal lens, a liquid lens, a refractive element, a diffractive element, or some combination thereof. In some embodiments, the lenslet and/or at least one of the additional optical components is able to dynamically adjust its optical power. For example, the lenslet may be a liquid crystal lens or a liquid lens. Dynamic adjustment of a surface profile the lenslet and/or at least one additional optical component may provide additional directional control of light projected from a waveguide element.

In the illustrated example, the holographic object volume 255 of the LF display has boundaries formed by light ray 256 and light ray 257, but could be formed by other rays. The holographic object volume 255 is a continuous volume that extends both in front (i.e., towards the viewer 280) of the energy waveguide layer 240 and behind it (i.e., away from the viewer 280). In the illustrated example, ray 256 and ray 257 are projected from opposite edges of the LF display module 210 at the highest angle relative to the normal to the display surface 277 that may be perceived by a user, but these could be other projected rays. The rays define the field-of-view of the display, and, thus, define the boundaries for the holographic viewing volume 285. In some cases, the rays define a holographic viewing volume where the full display can be observed without vignetting (e.g., an ideal viewing volume). As the field of view of the display increases, the convergence point of ray 256 and ray 257 will be closer to the display. Thus, a display having a larger field of view allows a viewer 280 to see the full display at a closer viewing distance. Additionally, ray 256 and 257 may form an ideal holographic object volume. Holographic objects presented in an ideal holographic object volume can be seen anywhere in the viewing volume 285.

In some examples, holographic objects may be presented to only a portion of the viewing volume 285. In other words, holographic object volumes may be divided into any number of viewing sub-volumes (e.g., viewing sub-volume 290). Additionally, holographic objects can be projected outside of the holographic object volume 255. For example, holographic object 251 is presented outside of holographic object volume 255. Because the holographic object 251 is presented outside of the holographic object volume 255 it cannot be viewed from every location in the viewing volume 285. For example, holographic object 251 may be visible from a location in viewing sub-volume 290, but not visible from the location of the viewer 280.

Figure 2B:
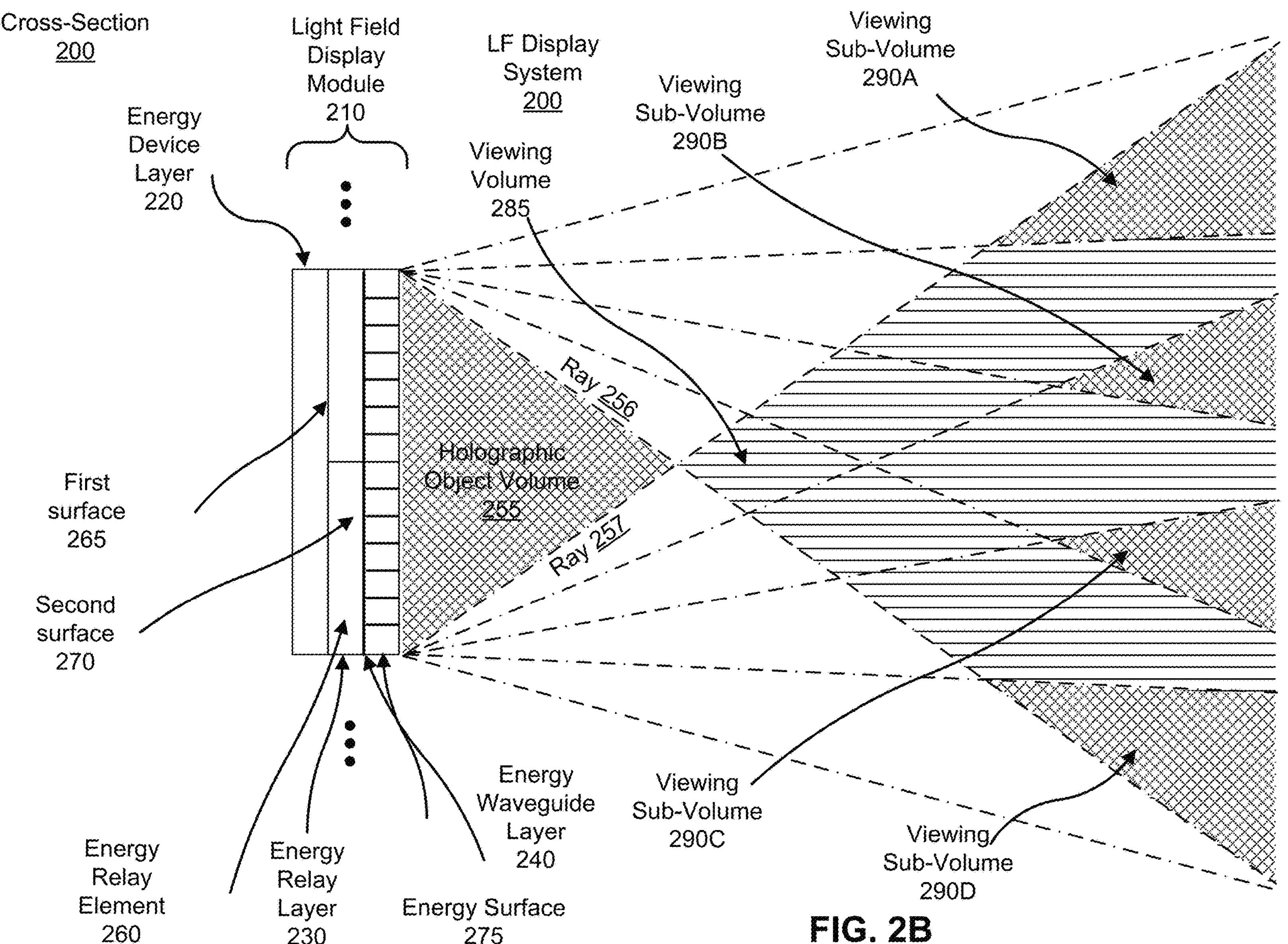
FIG. 2B is a cross section of a portion of a light field display module, in accordance with one or more embodiments.

For example, we turn to FIG. 2B to illustrate viewing holographic content from different viewing sub-volumes. FIG. 2B illustrates a cross section 200 of a portion of a LF display module, in accordance with one or more embodiments. The cross-section of FIG. 2B is the same as the cross-section of FIG. 2A. However, FIG. 2B illustrates a different set of light rays projected from the LF display module 210. Ray 256 and ray 257 still form a holographic object volume 255 and a viewing volume 285. However, as shown, rays projected from the top of the LF display module 210 and the bottom of the LF display module 210 overlap to form various viewing sub-volumes (e.g., view sub-volumes 290A, 290B, 290C, and 290D) within the viewing volume 285. A viewer in the first viewing sub-volume (e.g., 290A) may be able to perceive holographic content presented in the holographic object volume 255 that viewers in the other viewing sub-volumes (e.g., 290B, 290C, and 290D) are unable to perceive.

More simply, as illustrated in FIG. 2A, holographic object volume 255 is a volume in which holographic objects may be presented by LF display system such that they may be perceived by viewers (e.g., viewer 280) in viewing volume 285. In this way, the viewing volume 285 is an example of an ideal viewing volume, while the holographic object volume 255 is an example of an ideal object volume. However, in various configurations, viewers may perceive holographic objects presented by LF display system 200 in other example holographic object volumes. More generally, an "eye-line guideline" applies when viewing holographic content projected from an LF display module. The eye-line guideline asserts that the line formed by a viewer's eye position and a holographic object being viewed must intersect a LF display surface.

When viewing holographic content presented by the LF display module 210, each eye of the viewer 280 sees a different perspective of the holographic object 250 because the holographic content is presented according to a 4D light field function. Moreover, as the viewer 280 moves within the viewing volume 285 he/she would also see different perspectives of the holographic object 250 as would other viewers within the viewing volume 285. As will be appreciated by one of ordinary skill in the art, a 4D light field function is well known in the art and will not be elaborated further herein.

As described in more detail herein, in some embodiments, the LF display can project more than one type of energy. For example, the LF display may project two types of energy, such as, for example, mechanical energy and electromagnetic energy. In this configuration, energy relay layer 230 may include two separate energy relays which are interleaved together at the energy surface 275, but are separated such that the energy is relayed to two different energy device layers 220. Here, one relay may be configured to transport electromagnetic energy, while another relay may be configured to transport mechanical energy. In some embodiments, the mechanical energy may be projected from locations between the electromagnetic waveguide elements on the energy waveguide layer 240, helping form structures that inhibit light from being transported from one electromagnetic waveguide element to another. In some embodiments, the energy waveguide layer 240 may also include waveguide elements that transport focused ultrasound along specific propagation paths in accordance with display instructions from a controller.

Note that in alternate embodiments (not shown), the LF display module 210 does not include the energy relay layer 230. In this case, the energy surface 275 is an emission surface formed using one or more adjacent electronic displays within the energy device layer 220. And in some embodiments, with no energy relay layer, a separation between edges of adjacent electronic displays is less than a minimum perceptible contour as defined by a visual acuity of a human eye having 20/40 vision, such that the energy surface is effectively seamless from the perspective of the viewer 280 within the viewing volume 285.

LF Display Modules

Figure 3A:
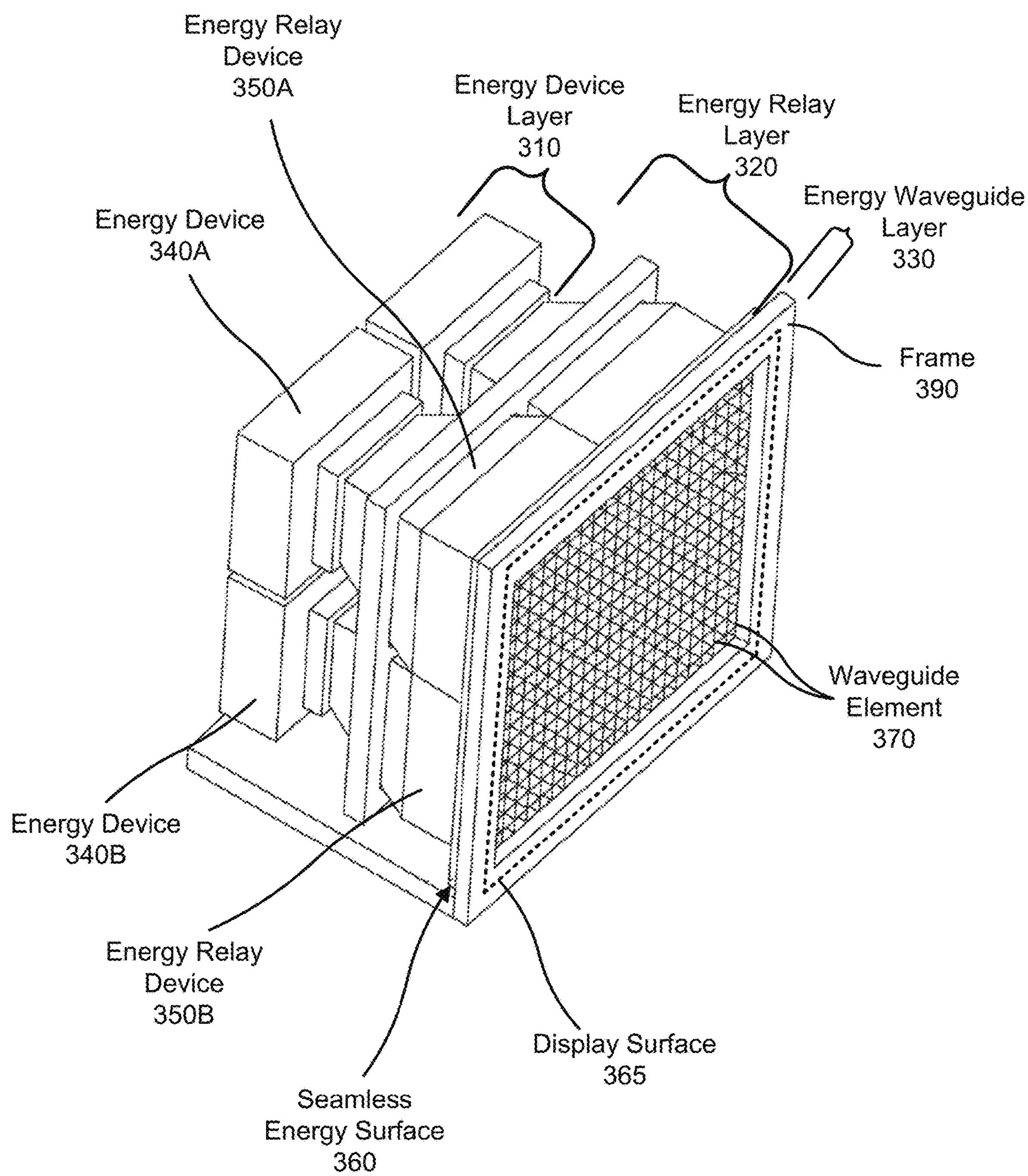
FIG. 3A is a perspective view of a light field display module, in accordance with one or more embodiments.

FIG. 3A is a perspective view of a LF display module 300A, in accordance with one or more embodiments. The LF display module 300A may be the LF display module 110 and/or the LF display module 210. In other embodiments, the LF display module 300A may be some other LF display module. In the illustrated embodiment, the LF display module 300A includes an energy device layer 310, and energy relay layer 320, and an energy waveguide layer 330. The LF display module 300A is configured to present holographic content from a display surface 365 as described herein. For convenience, the display surface 365 is illustrated as a dashed outline on the frame 390 of the LF display module 300A, but is, more accurately, the surface directly in front of waveguide elements bounded by the inner rim of the frame 390. The display surface 365 includes a plurality of projection locations from which energy can be projected. Some embodiments of the LF display module 300A have different components than those described here. For example, in some embodiments, the LF display module 300A does not include the energy relay layer 320. Similarly, the functions can be distributed among the components in a different manner than is described here.

The energy device layer 310 is an embodiment of the energy device layer 220. The energy device layer 310 includes four energy devices 340 (three are visible in the figure). The energy devices 340 may all be the same type (e.g., all electronic displays), or may include one or more different types (e.g., includes electronic displays and at least one acoustic energy device).

The energy relay layer 320 is an embodiment of the energy relay layer 230. The energy relay layer 320 includes four energy relay devices 350 (three are visible in the figure). The energy relay devices 350 may all relay the same type of energy (e.g., light), or may relay one or more different types (e.g., light and sound). Each of the relay devices 350 includes a first surface and a second surface, the second surface of the energy relay devices 350 being arranged to form a singular seamless energy surface 360. In the illustrated embodiment, each of the energy relay devices 350 are tapered such that the first surface has a smaller surface area than the second surface, which allows accommodation for the mechanical envelopes of the energy devices 340 on the small end of the tapers. This also allows the seamless energy surface to be borderless, since the entire area can project energy. This means that this seamless energy surface can be tiled by placing multiple instances of LF display module 300A together, without dead space or bezels, so that the entire combined surface is seamless. In other embodiments, the first surface and the second surface have the same surface area.

The energy waveguide layer 330 is an embodiment of the energy waveguide layer 240. The energy waveguide layer 330 includes a plurality of waveguide elements 370. As discussed above with respect to FIG. 2, the energy waveguide layer 330 is configured to direct energy from the seamless energy surface 360 along specific propagation paths in accordance with a 4D light field function to form a holographic object. Note that in the illustrated embodiment the energy waveguide layer 330 is bounded by a frame 390. In other embodiments, there is no frame 390 and/or a thickness of the frame 390 is reduced. Removal or reduction of thickness of the frame 390 can facilitate tiling the LF display module 300A with additional LF display modules.

Note that in the illustrated embodiment, the seamless energy surface 360 and the energy waveguide layer 330 are planar. In alternate embodiments, not shown, the seamless energy surface 360 and the energy waveguide layer 330 may be curved in one or more dimensions.

The LF display module 300A can be configured with additional energy sources that reside on the surface of the seamless energy surface, and allow the projection of an energy field in additional to the light field. In one embodiment, an acoustic energy field may be projected from electrostatic speakers (not illustrated) mounted at any number of locations on the seamless energy surface 360. Further, the electrostatic speakers of the LF display module 300A are positioned within the light field display module 300A such that the dual-energy surface simultaneously projects sound fields and holographic content. For example, the electrostatic speakers may be formed with one or more diaphragm elements that are transmissive to some wavelengths of electromagnetic energy, and driven with one or more conductive elements (e.g., planes which sandwich the one or more diaphragm elements). The electrostatic speakers may be mounted on to the seamless energy surface 360, so that the diaphragm elements cover some of the waveguide elements. The conductive electrodes of the speakers may be co-located with structures designed to inhibit light transmission between electromagnetic waveguides, and/or located at positions between electromagnetic waveguide elements (e.g., frame 390). In various configurations, the speakers can project an audible sound and/or many sources of focused ultrasonic energy that produces a haptic surface.

In some configurations an energy device 340 may sense energy. For example, an energy device may be a microphone, a light sensor, an acoustic transducer, etc. As such, the energy relay devices may also relay energy from the seamless energy surface 360 to the energy device layer 310. That is, the seamless energy surface 360 of the LF display module forms a bidirectional energy surface when the energy devices and energy relay devices 340 are configured to simultaneously emit and sense energy (e.g., emit light fields and sense sound).

More broadly, an energy device 340 of a LF display module 340 can be either an energy source or an energy sensor. The LF display module 300A can include various types of energy devices that act as energy sources and/or energy sensors to facilitate the projection of high quality holographic content to a user. Other sources and/or sensors may include thermal sensors or sources, infrared sensors or sources, image sensors or sources, mechanical energy transducers that generate acoustic energy, feedback sources, etc. Many other sensors or sources are possible. Further, the LF display modules can be tiled such that the LF display module can form an assembly that projects and senses multiple types of energy from a large aggregate seamless energy surface In various embodiments of LF display module 300A, the seamless energy surface 360 can have various surface portions where each surface portion is configured to project and/or emit specific types of energy. For example, when the seamless energy surface is a dual-energy surface, the seamless energy surface 360 includes one or more surface portions that project electromagnetic energy, and one or more other surface portions that project ultrasonic energy. The surface portions that project ultrasonic energy may be located on the seamless energy surface 360 between electromagnetic waveguide elements, and/or co-located with structures designed to inhibit light transmission between electromagnetic waveguide elements. In an example where the seamless energy surface is a bidirectional energy surface, the energy relay layer 320 may include two types of energy relay devices interleaved at the seamless energy surface 360. In various embodiments, the seamless energy surface 360 may be configured such that portions of the surface under any particular waveguide element 370 are all energy sources, all energy sensors, or a mix of energy sources and energy sensors.

Figure 3B:
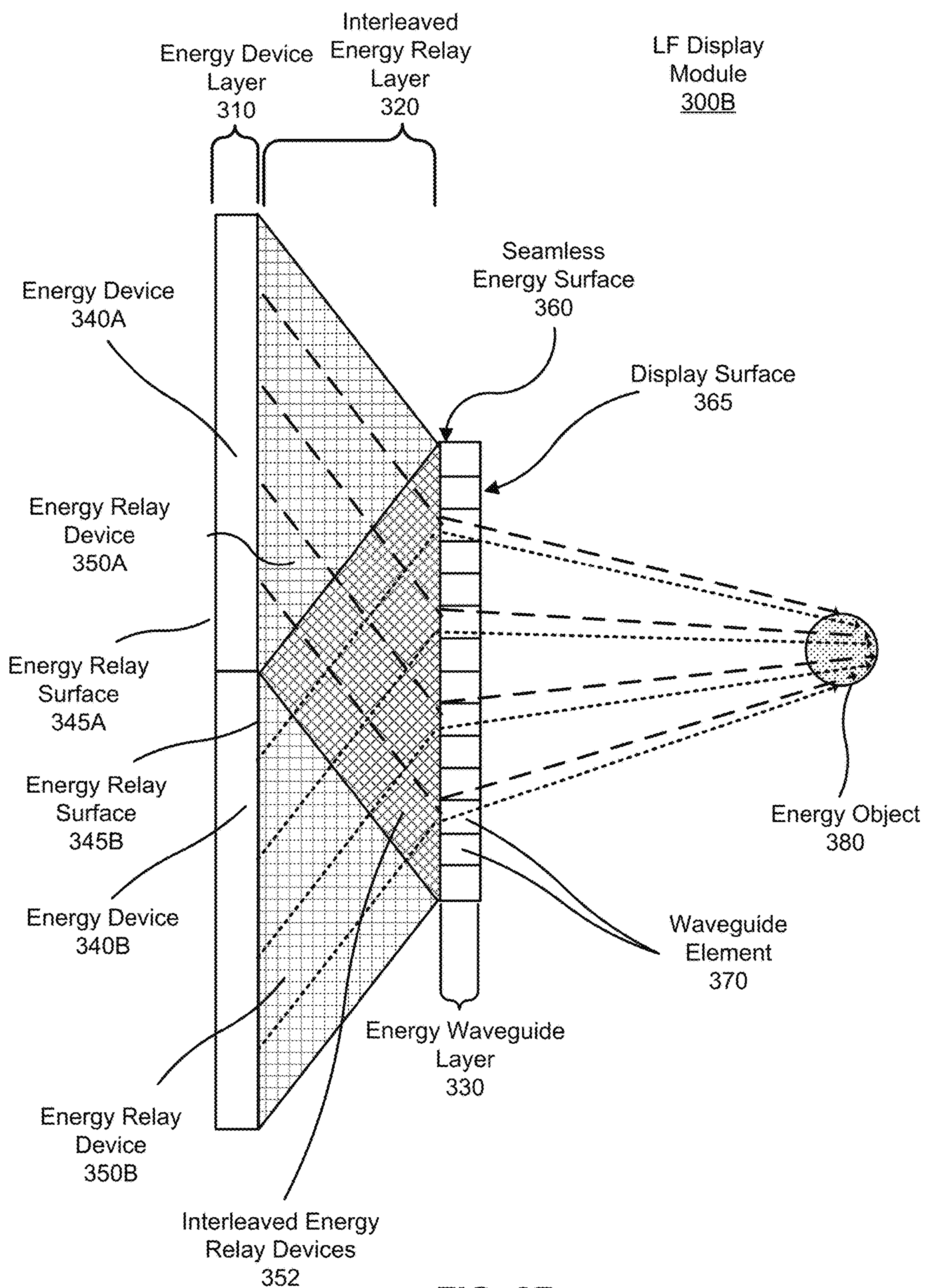
FIG. 3B is a cross-sectional view of a light field display module which includes interleaved energy relay devices, in accordance with one or more embodiments.

FIG. 3B is a cross-sectional view of a LF display module 300B which includes interleaved energy relay devices, in accordance with one or more embodiments. Energy relay device 350A transports energy between the energy relay first surface 345A connected to energy device 340A, and the seamless energy surface 360. Energy relay 350B transports energy between the energy relay first surface 345B connected to energy device 340B, and the seamless energy surface 360. Both relay devices are interleaved at interleaved energy relay device 352, which is connected to the seamless energy surface 360. In this configuration, surface 360 contains interleaved energy locations of both energy devices 340A and 340B, which may be energy sources or energy sensors. Accordingly, the LF display module 300B may be configured as either a dual energy projection device for projecting more than one type of energy, or as a bidirectional energy device for simultaneously projecting one type of energy and sensing another type of energy. The LF display module 300B may be the LF display module 110 and/or the LF display module 210. In other embodiments, the LF display module 300B may be some other LF display module.

The LF display module 300B includes many components similarly configured to those of LF display module 300A in FIG. 3A. For example, in the illustrated embodiment, the LF display module 300B includes an energy device layer 310, energy relay layer 320, a seamless energy surface 360, and an energy waveguide layer 330 including at least the same functionality of those described in regard to FIG. 3A. Additionally, the LF display module 300B may present and/or receive energy from the display surface 365. Notably, the components of the LF display module 300B are alternatively connected and/or oriented than those of the LF display module 300A in FIG. 3A. Some embodiments of the LF display module 300B have different components than those described here. Similarly, the functions can be distributed among the components in a different manner than is described here. FIG. 3B illustrates the design of a single LF display module 300B that may be tiled to produce a dual energy projection surface or a bidirectional energy surface with a larger area.

In an embodiment, the LF display module 300B is a LF display module of a bidirectional LF display system. A bidirectional LF display system may simultaneously project energy and sense energy from the display surface 365. The seamless energy surface 360 contains both energy projecting and energy sensing locations that are closely interleaved on the seamless energy surface 360. Therefore, in the example of FIG. 3B, the energy relay layer 320 is configured in a different manner than the energy relay layer of FIG. 3A. For convenience, the energy relay layer of LF display module 300B will be referred to herein as the "interleaved energy relay layer."

The interleaved energy relay layer 320 includes two legs: a first energy relay device 350A and a second energy relay device 350B. Each of the legs are illustrated as a lightly shaded area in FIG. 3B. Each of the legs may be made of a flexible relay material, and formed with a sufficient length to use with energy devices of various sizes and shapes. In some regions of the interleaved energy relay layer, the two legs are tightly interleaved together as they approach the seamless energy surface 360. In the illustrated example, the interleaved energy relay devices 352 are illustrated as a darkly shaded area.

While interleaved at the seamless energy surface 360, the energy relay devices are configured to relay energy to/from different energy devices. The energy devices are at energy device layer 310. As illustrated, energy device 340A is connected to energy relay device 350A and energy device 340B is connected to energy relay device 350B. In various embodiments, each energy device may be an energy source or energy sensor.

An energy waveguide layer 330 includes waveguide elements 370 to steer energy waves from the seamless energy surface 360 along projected paths towards a series of convergence points. In this example, a holographic object 380 is formed at the series of convergence points. Notably, as illustrated, the convergence of energy at the holographic object 380 occurs on the viewer side (i.e., the front side), of the display surface 365. However, in other examples, the convergence of energy may be anywhere in the holographic object volume, which extends both in front of the display surface 365 and behind the display surface 365. The waveguide elements 370 can simultaneously steer incoming energy to an energy device (e.g., an energy sensor), as described below.

In one example embodiment of LF display module 300B, an emissive display is used as an energy source (e.g., energy device 340A) and an imaging sensor is used as an energy sensor (e.g., energy device 340B). In this manner, the LF display module 300B can simultaneously project holographic content and detect light from the volume in front of the display surface 365. In this manner, this embodiment of the LF display module 300B functions as both a LF display and an LF sensor.

In an embodiment, the LF display module 300B is configured to simultaneously project a light field from projection locations on the display surface to the front of the display surface and capture a light field from front of the display surface at the projection locations. In this embodiment, the energy relay device 350A connects a first set of locations at the seamless energy surface 360 positioned under the waveguide elements 370 to an energy device 340A. In an example, energy device 340A is an emissive display having an array of source pixels. The energy relay device 340B connects a second set of locations at the seamless energy surface 360 positioned under waveguide elements 370 to an energy device 340B. In an example, the energy device 340B is an imaging sensor having an array of sensor pixels. The LF display module 300B may be configured such that the locations at the seamless energy surface 365 that are under a particular waveguide element 370 are all emissive display locations, all imaging sensor locations, or some combination of these locations. In other embodiments, the bidirectional energy surface can project and receive various other forms of energy.

In another example embodiment of the LF display module 300B, the LF display module is configured to project two different types of energy. For example, in an embodiment, energy device 340A is an emissive display configured to emit electromagnetic energy and energy device 340B is an ultrasonic transducer configured to emit mechanical energy. As such, both light and sound can be projected from various locations at the seamless energy surface 360. In this configuration, energy relay device 350A connects the energy device 340A to the seamless energy surface 360 and relays the electromagnetic energy. The energy relay device is configured to have properties (e.g. varying refractive index) which make it efficient for transporting electromagnetic energy. Energy relay device 350B connects the energy device 340B to the seamless energy surface 360 and relays mechanical energy. Energy relay device 350B is configured to have properties for efficient transport of ultrasound energy (e.g. distribution of materials with different acoustic impedance). In some embodiments, the mechanical energy may be projected from locations between the waveguide elements 370 on the energy waveguide layer 330. The locations that project mechanical energy may form structures that serve to inhibit light from being transported from one electromagnetic waveguide element to another. In one example, a spatially separated array of locations that project ultrasonic mechanical energy can be configured to create three-dimensional haptic shapes and surfaces in mid-air. The surfaces may coincide with projected holographic objects (e.g., holographic object 380). In some examples, phase delays and amplitude variations across the array can assist in creating the haptic shapes.

In various embodiments, the LF display module 300B with interleaved energy relay devices may include multiple energy device layers with each energy device layer including a specific type of energy device. In these examples, the energy relay layers are configured to relay the appropriate type of energy between the seamless energy surface 360 and the energy device layer 310.

Tiled LF Display Modules

Figure 4A:
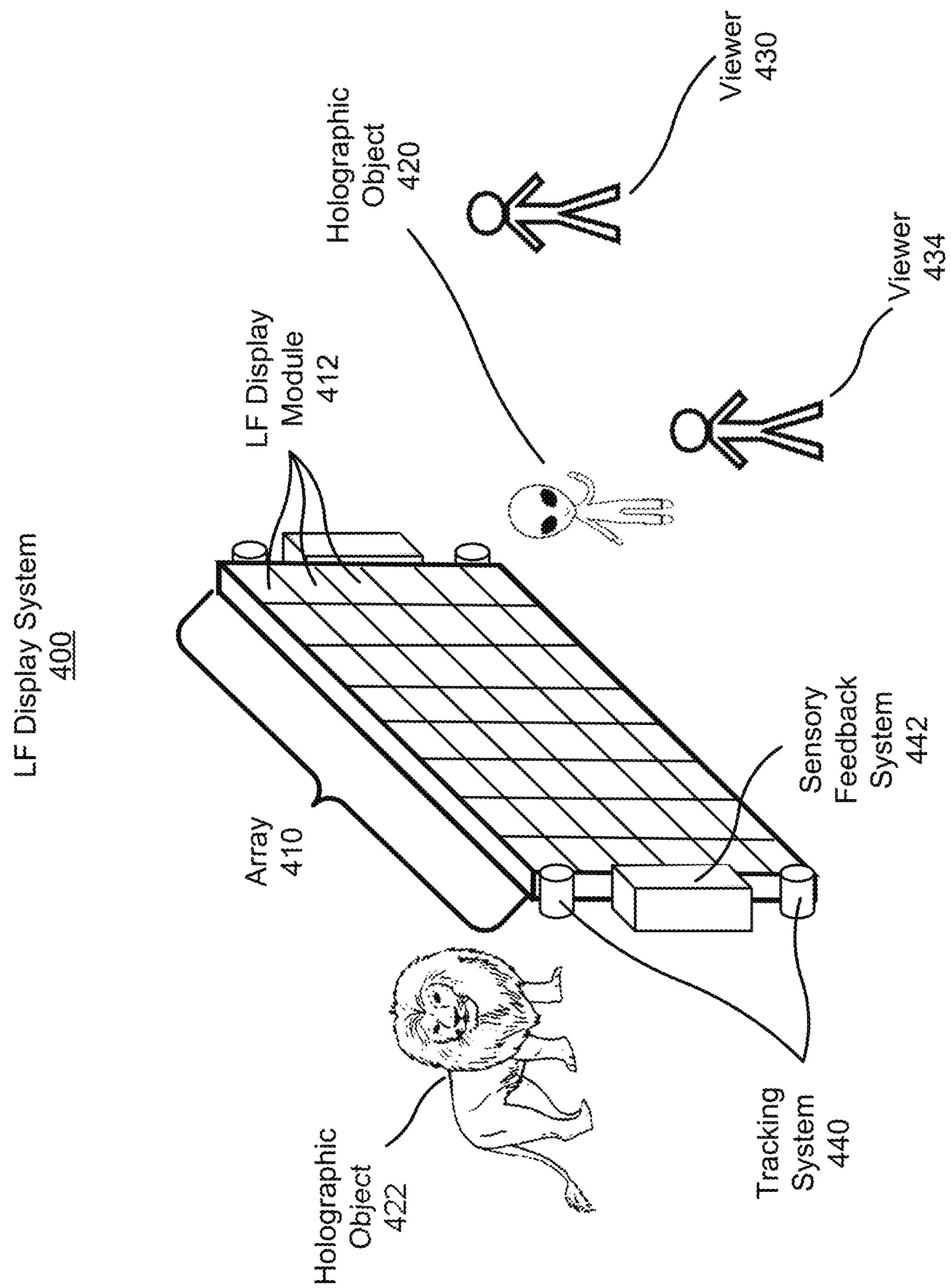
FIG. 4A is a perspective view of portion of a light field display system that is tiled in two dimensions to form a single-sided seamless surface environment, in accordance with one or more embodiments.

FIG. 4A is a perspective view of a portion of LF display system 400 that is tiled in two dimensions to form a single-sided seamless surface environment, in accordance with one or more embodiments. The LF display system 400 includes a plurality of LF display modules that are tiled to form an array 410. More explicitly, each of the small squares in the array 410 represents a tiled LF display module 412. The LF display module 412 may be the same as LF display module 300A or 300B. The array 410 may cover, for example, some or all of a surface (e.g., a wall) of a room. The LF array may cover other surfaces, such as, for example, a table top, a billboard, a rotunda, etc.

The array 410 may project one or more holographic objects. For example, in the illustrated embodiment, the array 410 projects a holographic object 420 and a holographic object 422. Tiling of the LF display modules 412 allows for a much larger viewing volume as well as allows for objects to be projected out farther distances from the array 410. For example, in the illustrated embodiment, the viewing volume is, approximately, the entire area in front of and behind the array 410 rather than a localized volume in front of (and behind) a LF display module 412.

In some embodiments, the LF display system 400 presents the holographic object 420 to a viewer 430 and a viewer 434. The viewer 430 and the viewer 434 receive different perspectives of the holographic object 420. For example, the viewer 430 is presented with a direct view of the holographic object 420, whereas the viewer 434 is presented with a more oblique view of the holographic object 420. As the viewer 430 and/or the viewer 434 move, they are presented with different perspectives of the holographic object 420. This allows a viewer to visually interact with a holographic object by moving relative to the holographic object. For example, as the viewer 430 walks around a holographic object 420, the viewer 430 sees different sides of the holographic object 420 as long as the holographic object 420 remains in the holographic object volume of the array 410. Accordingly, the viewer 430 and the viewer 434 may simultaneously see the holographic object 420 in real-world space as if it is truly there. Additionally, the viewer 430 and the viewer 434 do not need to wear an external device in order to see the holographic object 420, as the holographic object 420 is visible to viewers in much the same way a physical object would be visible. Additionally, here, the holographic object 422 is illustrated behind the array because the viewing volume of the array extends behind the surface of the array. In this manner, the holographic object 422 may be presented to the viewer 430 and/or viewer 434.

In some embodiments, the LF display system 400 may include a tracking system that tracks positions of the viewer 430 and the viewer 434. In some embodiments, the tracked position is the position of a viewer. In other embodiments, the tracked position is that of the eyes of a viewer. The position tracking of the eye is different from gaze tracking which tracks where an eye is looking (e.g., uses orientation to determine gaze location). The eyes of the viewer 430 and the eyes of the viewer 434 are in different locations.

In various configurations, the LF display system 400 may include one or more tracking systems. For example, in the illustrated embodiment of FIG. 4A, LF display system includes a tracking system 440 that is external to the array 410. Here, the tracking system may be a camera system coupled to the array 410. External tracking systems are described in more detail in regard to FIG. 5A. In other example embodiments, the tracking system may be incorporated into the array 410 as described herein. For example, an energy device (e.g., energy device 340) of one or more LF display modules 412 containing a bidirectional energy surface included in the array 410 may be configured to capture images of viewers in front of the array 410. In whichever case, the tracking system(s) of the LF display system 400 determines tracking information about the viewers (e.g., viewer 430 and/or viewer 434) viewing holographic content presented by the array 410.

Tracking information describes a position in space (e.g., relative to the tracking system) for the position of a viewer, or a position of a portion of a viewer (e.g. one or both eyes of a viewer, or the extremities of a viewer). A tracking system may use any number of depth determination techniques to determine tracking information. The depth determination techniques may include, e.g., structured light, time of flight, stereo imaging, some other depth determination technique, or some combination thereof. The tracking system may include various systems configured to determine tracking information. For example, the tracking system may include one or more infrared sources (e.g., structured light sources), one or more imaging sensors that can capture images in the infrared (e.g., red-blue-green-infrared camera), and a processor executing tracking algorithms. The tracking system may use the depth estimation techniques to determine positions of viewers. In some embodiments, the LF display system 400 generates holographic objects based on tracked positions, motions, or gestures of the viewer 430 and/or the viewer 434 as described herein. For example, the LF display system 400 may generate a holographic object responsive to a viewer coming within a threshold distance of the array 410 and/or a particular position.

The LF display system 400 may present one or more holographic objects that are customized to each viewer based in part on the tracking information. For example, the viewer 430 may be presented with the holographic object 420, but not the holographic object 422. Similarly, the viewer 434 may be presented with the holographic object 422, but not the holographic object 420. For example, the LF display system 400 tracks a position of each of the viewer 430 and the viewer 434. The LF display system 400 determines a perspective of a holographic object that should be visible to a viewer based on their position relative to where the holographic object is to be presented. The LF display system 400 selectively projects light from specific pixels that correspond to the determined perspective. Accordingly, the viewer 434 and the viewer 430 can simultaneously have experiences that are, potentially, completely different. In other words, the LF display system 400 may present holographic content to viewing sub-volumes of the viewing volume (i.e., similar to the viewing sub-volumes 290A, 290B, 290C, and 290D shown in FIG. 2B). For example, as illustrated, because the LF display system 400 can track the position of the viewer 430, the LF display system 400 may present space content (e.g., holographic object 420) to a viewing sub-volume surrounding the viewer 430 and safari content (e.g., holographic object 422) to a viewing sub-volume surrounding the viewer 434. In contrast, conventional systems would have to use individual headsets to provide a similar experience.

In some embodiments the LF display system 400 may include one or more sensory feedback systems. The sensory feedback systems provide other sensory stimuli (e.g., tactile, audio, or smell) that augment the holographic objects 420 and 422. For example, in the illustrated embodiment of FIG. 4A, the LF display system 400 includes a sensory feedback system 442 external to the array 410. In one example, the sensory feedback system 442 may be an electrostatic speaker coupled to the array 410. External sensory feedback systems are described in more detail in regard to FIG. 5A. In other example embodiments, the sensory feedback system may be incorporated into the array 410 as described herein. For example, an energy device (e.g., energy device 340A in FIG. 3B) of a LF display module 412 included in the array 410 may be configured to project ultrasonic energy to viewers in front of the array and/or receive imaging information from viewers in front of the array. In whichever case, the sensory feedback system presents and/or receives sensory content to/from the viewers (e.g., viewer 430 and/or viewer 434) viewing holographic content (e.g., holographic object 420 and/or holographic objected 422) presented by the array 410.

The LF display system 400 may include a sensory feedback system 442 that includes one or more acoustic projection devices external to the array. Alternatively or additionally, the LF display system 400 may include one or more acoustic projection devices integrated into the array 410 as described herein. The acoustic projection devices may consist of an array of ultrasonic sources configured to project a volumetric tactile surface. In some embodiments, the tactile surface may be coincident with a holographic object (e.g., at a surface of the holographic object 420) for one or more surfaces of a holographic object if a portion of a viewer gets within a threshold distance of the one or more surfaces. The volumetric tactile sensation may allow the user to touch and feel surfaces of the holographic object. The plurality of acoustic projection devices may also project an audible pressure wave that provides audio content (e.g., immersive audio) to viewers. Accordingly, the ultrasonic pressure waves and/or the audible pressure waves can act to complement a holographic object.

In various embodiments, the LF display system 400 may provide other sensory stimuli based in part on a tracked position of a viewer. For example, the holographic object 422 illustrated in FIG. 4A is a lion, and the LF display system 400 may have the holographic object 422 roar both visually (i.e., the holographic object 422 appears to roar) and audibly (i.e., one or more acoustic projection devices project a pressure wave that the viewer 430 perceives as a lion's roar emanating from the holographic object 422.

Note that, in the illustrated configuration, the holographic viewing volume may be limited in a manner similar to the viewing volume 285 of the LF display system 200 in FIG. 2. This can limit the amount of perceived immersion that a viewer will experience with a single wall display unit. One way to address this is to use multiple LF display modules that are tiled along multiple sides as described below with respect to FIG. 4B-4F.

Figure 4B:
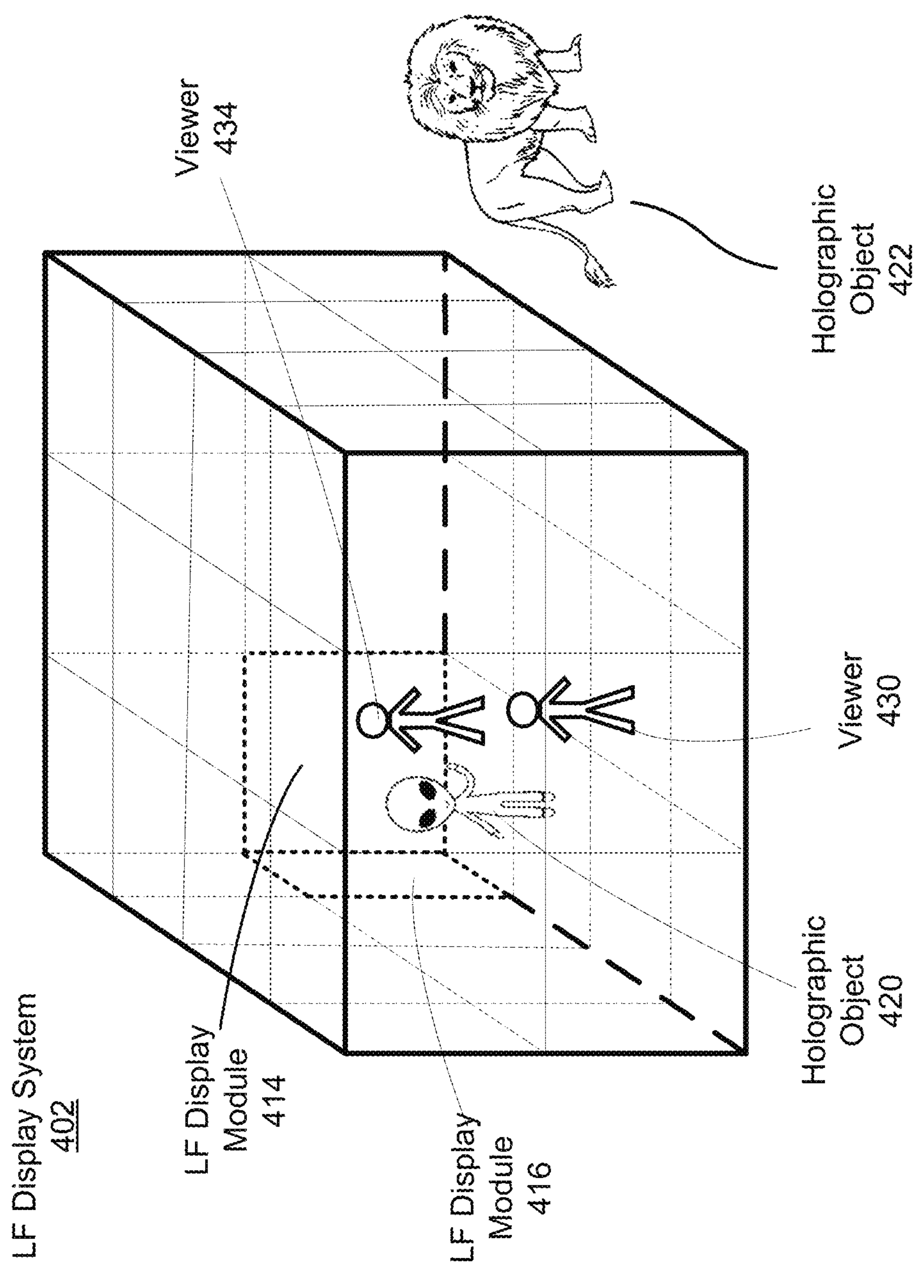
FIG. 4B is a perspective view of a portion of light field display system in a multi-sided seamless surface environment, in accordance with one or more embodiments.

FIG. 4B is a perspective view of a portion of a LF display system 402 in a multi-sided seamless surface environment, in accordance with one or more embodiments. The LF display system 402 is substantially similar to the LF display system 400 except that the plurality of LF display modules are tiled to create a multi-sided seamless surface environment. More specifically, the LF display modules are tiled to form an array that is a six-sided aggregated seamless surface environment. In FIG. 4B, the plurality of LF display modules cover all the walls, the ceiling, and the floor of a room. In other embodiments, the plurality of LF display modules may cover some, but not all of a wall, a floor, a ceiling, or some combination thereof. In other embodiments, a plurality of LF display modules are tiled to form some other aggregated seamless surface. For example, the walls may be curved such that a cylindrical aggregated energy environment is formed. Moreover, as described below with regard to FIGS. 6-9, in some embodiments, the LF display modules may be tiled to form a surface in a presentation space (e.g., walls, etc.).

The LF display system 402 may project one or more holographic objects. For example, in the illustrated embodiment the LF display system 402 projects the holographic object 420 into an area enclosed by the six-sided aggregated seamless surface environment. In this example, the viewing volume of the LF display system is also contained within the six-sided aggregated seamless surface environment. Note that, in the illustrated configuration, the viewer 434 may be positioned between the holographic object 420 and a LF display module 414 that is projecting energy (e.g., light and/or pressure waves) that is used to form the holographic object 420. Accordingly, the positioning of the viewer 434 may prevent the viewer 430 from perceiving the holographic object 420 formed from energy from the LF display module 414. However, in the illustrated configuration there is at least one other LF display module, e.g., a LF display module 416, that is unobstructed (e.g., by the viewer 434) and can project energy to form the holographic object 420 and be observed by viewer 430. In this manner, occlusion by viewers in the space can cause some portion of the holographic projections to disappear, but the effect is much less than if only one side of the volume was populated with holographic display panels. Holographic object 422 is illustrated "outside" the walls of the six-sided aggregated seamless surface environment because the holographic object volume extends behind the aggregated surface. Thus, the viewer 430 and/or the viewer 434 can perceive the holographic object 422 as "outside" of the enclosed six-sided environment which they can move throughout.

As described above in reference to FIG. 4A, in some embodiments, the LF display system 402 actively tracks positions of viewers and may dynamically instruct different LF display modules to present holographic content based on the tracked positions. Accordingly, a multi-sided configuration can provide a more robust environment (e.g., relative to FIG. 4A) for providing holographic objects where unconstrained viewers are free to move throughout the area enclosed by the multi-sided seamless surface environment.

Notably, various LF display systems may have different configurations. Further, each configuration may have a particular orientation of surfaces that, in aggregate, form a seamless display surface ("aggregate surface"). That is, the LF display modules of a LF display system can be tiled to form a variety of aggregate surfaces. For example, in FIG. 4B, the LF display system 402 includes LF display modules tiled to form a six-sided aggregate surface that approximates the walls of a room. In some other examples, an aggregate surface may only occur on a portion of a surface (e.g., half of a wall) rather than a whole surface (e.g., an entire wall). Some examples are described herein.

In some configurations, the aggregate surface of a LF display system may include an aggregate surface configured to project energy towards a localized viewing volume. Projecting energy to a localized viewing volume allows for a higher quality viewing experience by, for example, increasing the density of projected energy in a specific viewing volume, increasing the FOV for the viewers in that volume, and bringing the viewing volume closer to the display surface.

Figure 4C:
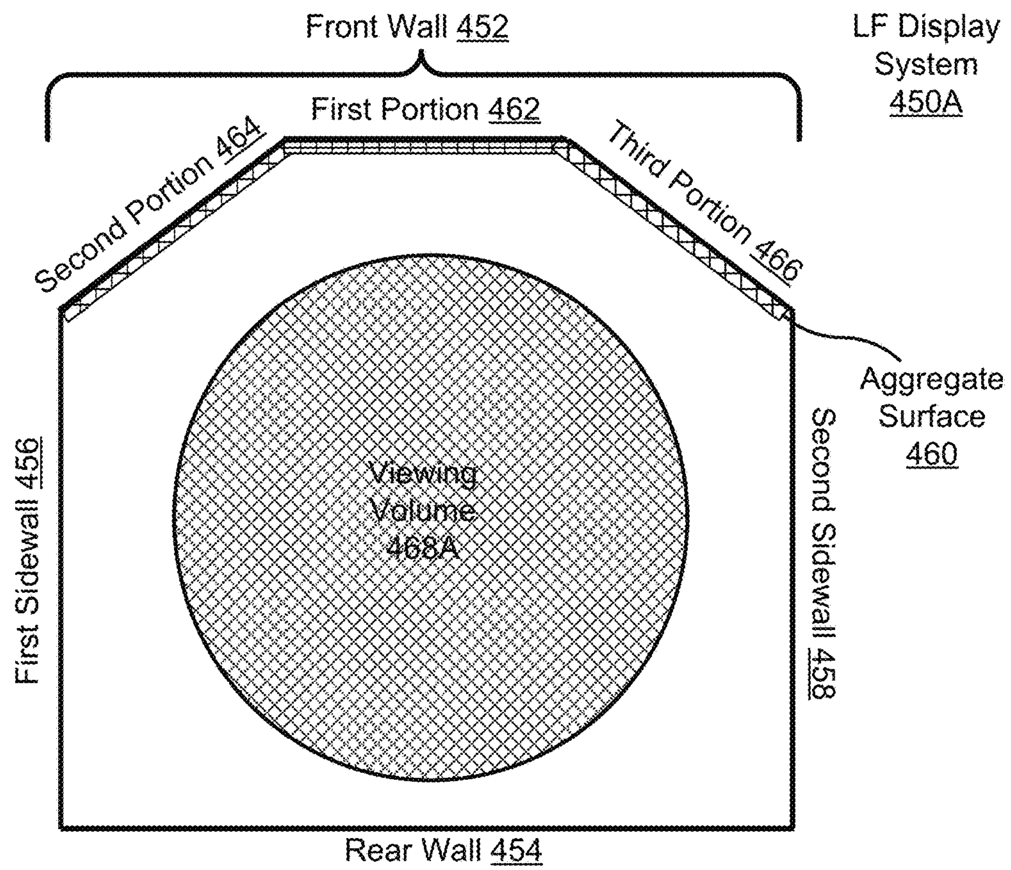
FIG. 4C is a top-down view of a light field display system with an aggregate surface in a winged configuration, in accordance with one or more embodiments.

For example, FIG. 4C illustrates top down view of a LF display system 450A with an aggregate surface in a "winged" configuration. In this example, the LF display system 450A is located in a room with a front wall 452, a rear wall 454, a first sidewall 456, a second sidewall 458, a ceiling (not shown), and a floor (not shown). The first sidewall 456, the second sidewall 458, the rear wall 454, floor, and the ceiling are all orthogonal. The LF display system 450A includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the first sidewall 456 and placed at an angle to project energy towards the center of the room (i.e., a first side surface), and (iii) a third portion 466 connecting the first portion 462 to the second sidewall 458 and placed at an angle to project energy towards the center of the room (i.e., a second side surface). The first portion is a vertical plane in the room and has a horizontal and a vertical axis. The second and third portions are angled towards the center of the room along the horizontal axis.

In this example, the viewing volume 468A of the LF display system 450A is in the center of the room and partially surrounded by the three portions of the aggregate surface 460. An aggregate surface that at least partially surrounds a viewer ("surrounding surface") increases the immersive experience of the viewers.

To illustrate, consider, for example, an aggregate surface with only a central surface. Referring to FIG. 2A, the rays that are projected from either end of the display surface create an ideal holographic volume and ideal viewing volumes as described above. Now consider, for example, if the central surface included two side surfaces angled towards the viewer. In this case, ray 256 and ray 257 would be projected at a greater angle from a normal of the central surface. Thus, the field of view of the viewing volume would increase. Similarly, the holographic viewing volume would be nearer the display surface. Additionally, because the two second and third portions tilted nearer the viewing volume, the holographic objects that are projected at a fixed distance from the display surface are closer to that viewing volume.

To simplify, a display surface with only a central surface has a planar field of view, a planar threshold separation between the (central) display surface and the viewing volume, and a planar proximity between a holographic object and the viewing volume. Adding one or more side surfaces angled towards the viewer increases the field of view relative to the planar field of view, decreases the separation between the display surface and the viewing volume relative to the planar separation, and increases the proximity between the display surface and a holographic object relative to the planar proximity. Further angling the side surfaces towards the viewer further increases the field of view, decreases the separation, and increases the proximity. In other words, the angled placement of the side surfaces increases the immersive experience for viewers.

Additionally, as described below in regards to FIG. 6, deflection optics may be used to optimize the size and position of the viewing volume for LF display parameters (e.g., dimensions and FOV).

Returning to FIG. 4D, in a similar example, FIG. 4D illustrates a side view of a LF display system 450B with an aggregate surface in a "sloped" configuration. In this example, the LF display system 450B is located in a room with a front wall 452, a rear wall 454, a first sidewall (not shown), a second sidewall (not shown), a ceiling 472, and a floor 474. The first sidewall, the second sidewall, the rear wall 454, floor 474, and the ceiling 472 are all orthogonal. The LF display system 450B includes LF display modules tiled to form an aggregate surface 460 covering the front wall. The front wall 452, and thus the aggregate surface 460, includes three portions: (i) a first portion 462 approximately parallel with the rear wall 454 (i.e., a central surface), (ii) a second portion 464 connecting the first portion 462 to the ceiling 472 and angled to project energy towards the center of the room (i.e., a first side surface), and (iii) a third portion 464 connecting the first portion 462 to the floor 474 and angled to project energy towards the center of the room (i.e., a second side surface). The first portion is a vertical plane in the room and has a horizontal and a vertical axis. The second and third portions are angled towards the center of the room along the vertical axis.

In this example, the viewing volume 468B of the LF display system 450B is in the center of the room and partially surrounded by the three portions of the aggregate surface 460. Similar to the configuration shown in FIG. 4C, the two side portions (e.g., second portion 464, and third portion 466) are angled to surround the viewer and form a surrounding surface. The surrounding surface increases the viewing FOV from the perspective of any viewer in the holographic viewing volume 468B. Additionally, the surrounding surface allows the viewing volume 468B to be closer to the surface of the displays such that projected objects appear closer. In other words, the angled placement of the side surfaces increases the field of view, decreases the separation, and increases the proximity of the aggregate surface, thereby increasing the immersive experience for viewers. Further, as will be discussed below, deflection optics may be used to optimize the size and position of the viewing volume 468B.

The sloped configuration of the side portions of the aggregate surface 460 enables holographic content to be presented closer to the viewing volume 468B than if the third portion 466 was not sloped. For example, the lower extremities (e.g., legs) of a character presented form a LF display system in a sloped configuration may seem closer and more realistic than if a LF display system with a flat front wall were used.

Additionally, the configuration of the LF display system and the environment which it is located may inform the shape and locations of the viewing volumes and viewing sub-volumes.

Figure 4D:
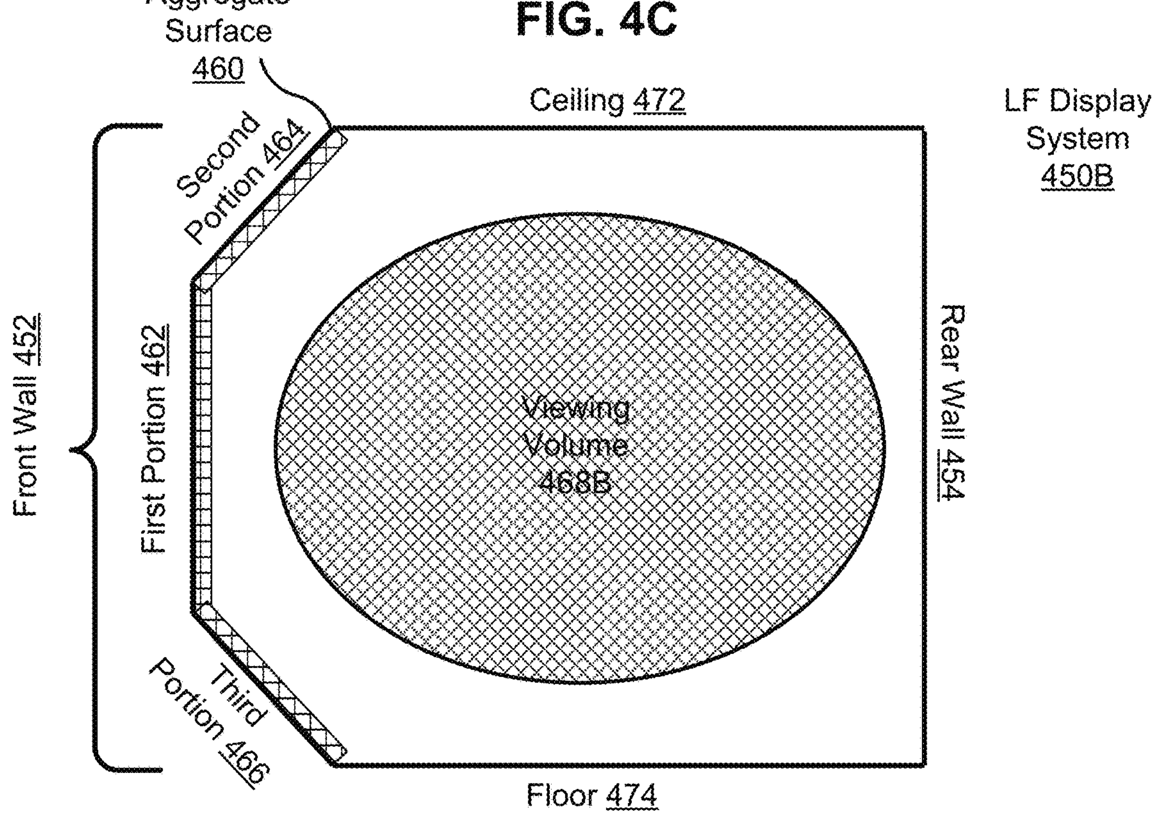
FIG. 4D is a side view of a light field display system with an aggregate surface in a sloped configuration, in accordance with one or more embodiments.
Figure 4E:
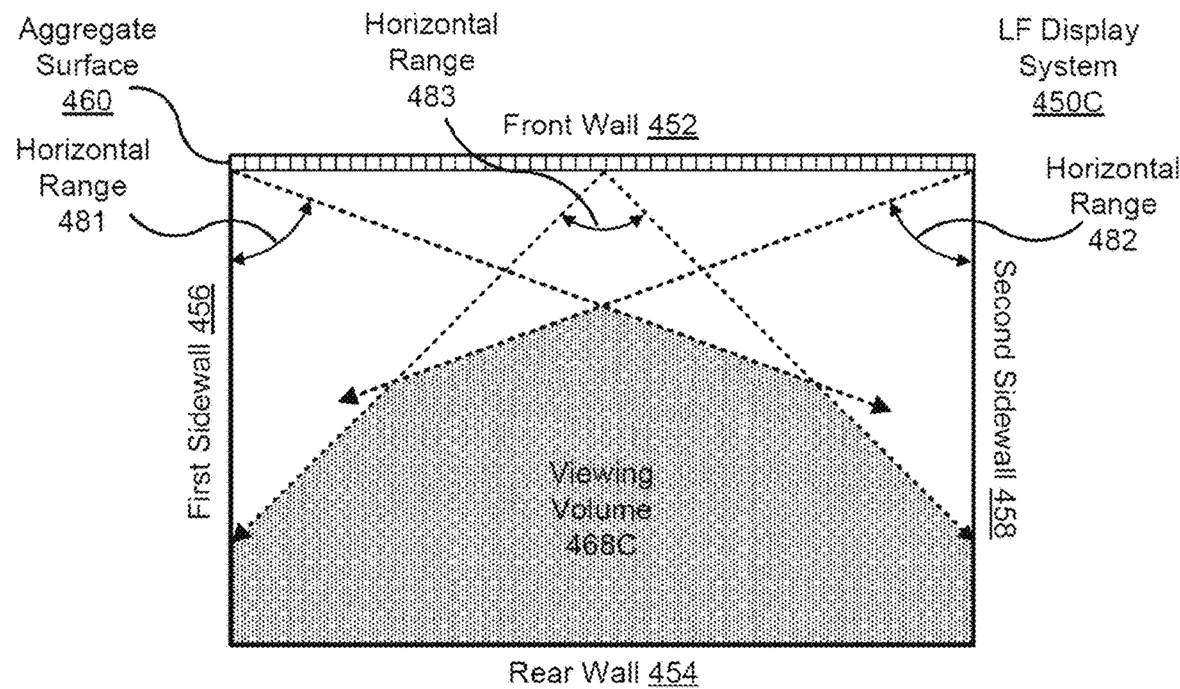
FIG. 4E is a top-down view of a light field display system with an aggregate surface on a front wall of a room, in accordance with one or more embodiments.

FIG. 4E, for example, illustrates a top down view of a LF display system 450C with an aggregate surface 460 on a front wall 452 of a room. In this example, the LF display system 450D is located in a room with a front wall 452, a rear wall 454, a first sidewall 456, a second sidewall 458, a ceiling (not shown), and a floor (not shown).

LF display system 450C projects various rays from the aggregate surface 460. From each position on the display surface, light rays are projected in an angular range that is centered on the viewing volume. The rays projected from the left side of the aggregate surface 460 have horizontal angular range 481, rays projected from the right side of the aggregate surface have horizontal angular range 482, and rays projected from the center of the aggregate surface 460 have horizontal angular range 483. In between these points, the projected rays may take on intermediate values of angle ranges as described below in regard to FIG. 6. Having a gradient deflection angle in the projected rays across the display surface in this manner creates a viewing volume 468C. Further, this configuration avoids wasting resolution of the display on projecting rays into the side walls 456 and 458.

Figure 4F:
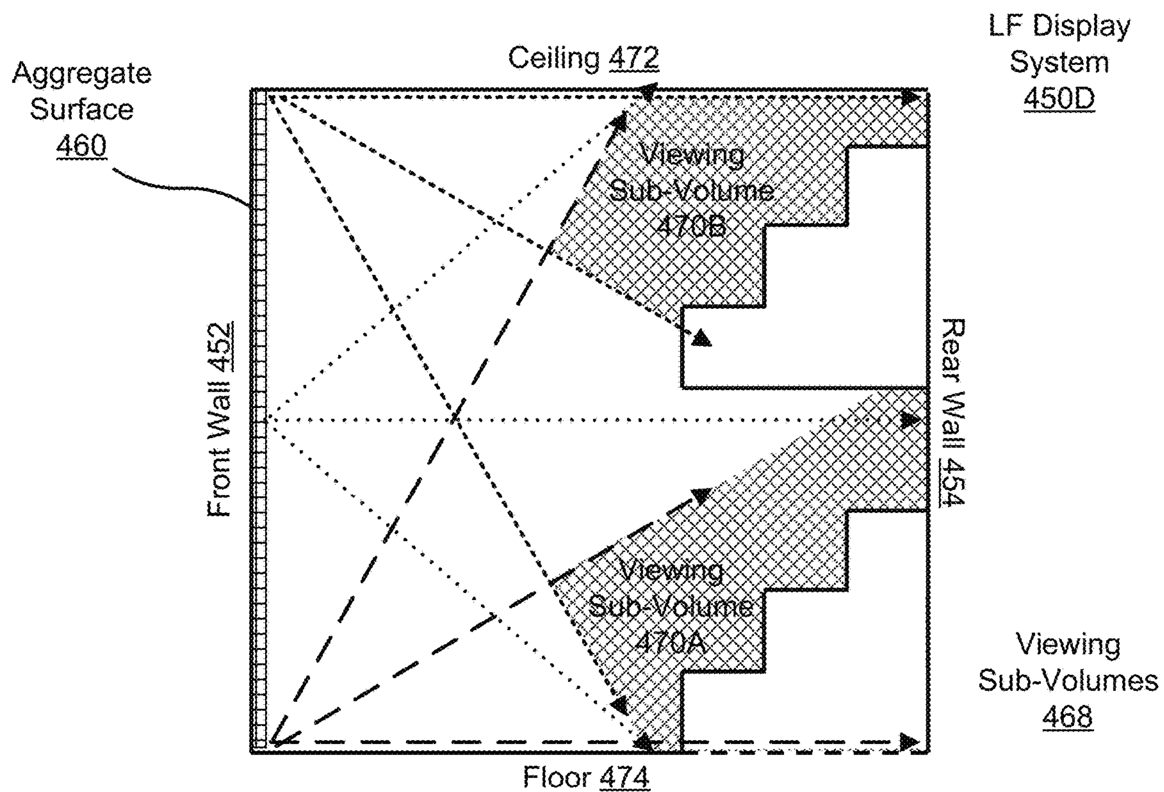
FIG. 4F is a side view of a side view of a LF display system with an aggregate surface on the front wall of the room, in accordance with one or more embodiments.

FIG. 4F illustrates a side view of a LF display system 450D with an aggregate surface 460 on a front wall 452 of a room. In this example, the LF display system 450E is located in a room with a front wall 452, a rear wall 454, a first sidewall (not shown), a second sidewall (not shown), a ceiling 472, and a floor 474. In this example, the floor is tiered such that each tier rises in steps moving from the front wall to the back wall. Here, each tier of the floor includes a viewing sub-volume (e.g., viewing sub volume 470A and 470B). A tiered floor allows for viewing sub-volumes that do not overlap. That is, each viewing sub-volume has a line of sight from the viewing sub-volume to the aggregate surface 460 that does not pass through another viewing sub-volume. In other words, this orientation produces a "stadium seating" effect in which the vertical offset between tiers allows an unobstructed line of sight which allows each tier to "see over" the viewing sub-volumes of other tiers. LF display systems including viewing sub-volumes that do not overlap may provide a higher quality viewing experience than LF display systems that have viewing volumes that do overlap. For example, in the configuration shown in FIG. 4F, different holographic content may be projected to the audiences in viewing sub-volumes 470A and 470B.

Control of a LF Display System

Figure 5A:
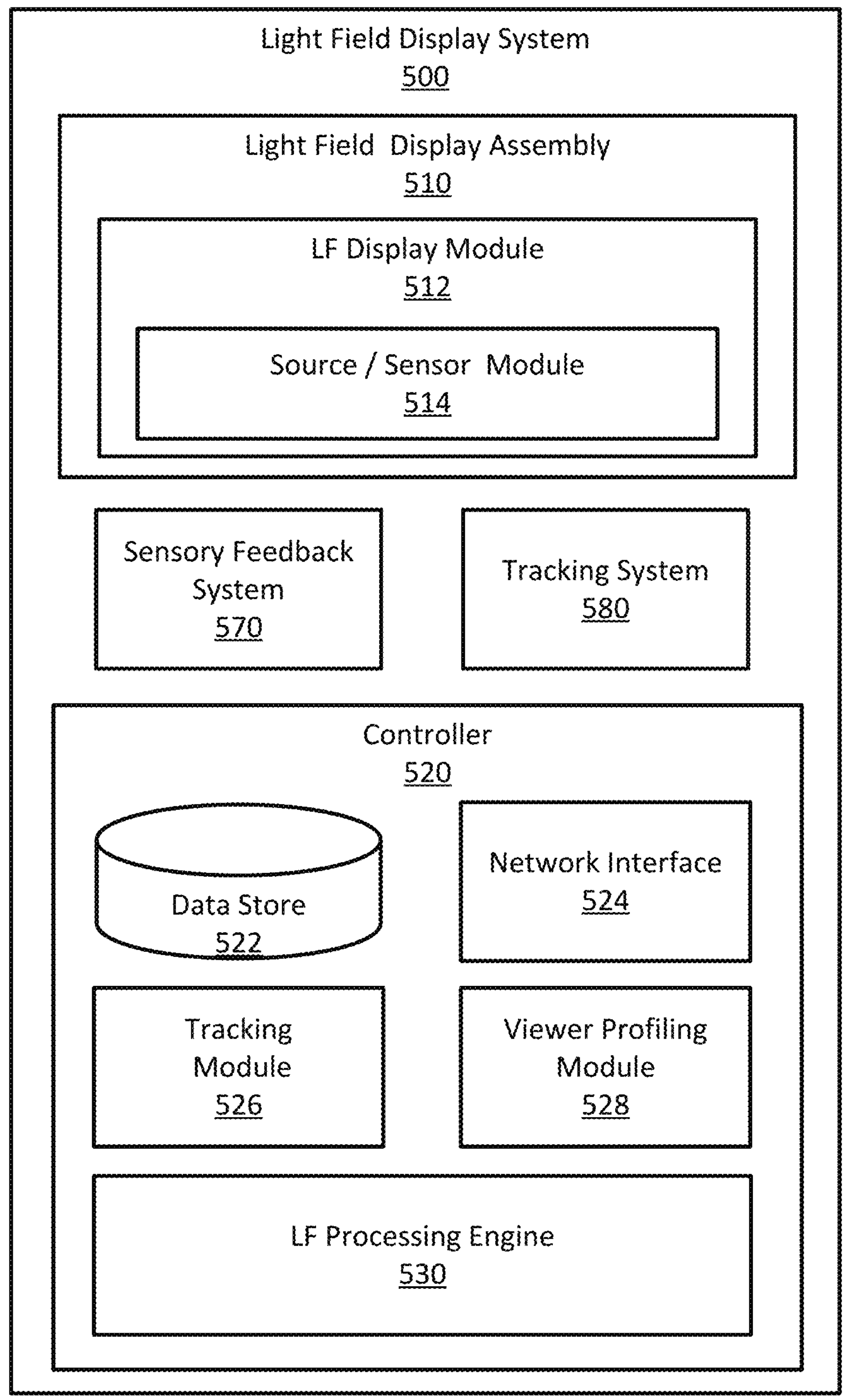
FIG. 5A is a block diagram of a light field display system, in accordance with one or more embodiments.

FIG. 5A is a block diagram of a LF display system 500, in accordance with one or more embodiments. The LF display system 500 comprises a LF display assembly 510 and a controller 520. The LF display assembly 510 includes one or more LF display modules 512 which project a light field. A LF display module 512 may include a source/sensor system 514 that includes an integrated energy source(s) and/or energy sensor(s) which project and/or sense other types of energy. The controller 520 includes a datastore 522, a network interface 524, and a LF processing engine 530. The controller 520 may also include a tracking module 526, and a viewer profiling module 528. In some embodiments, the LF display system 500 also includes a sensory feedback system 570 and a tracking system 580. The LF display systems described in the context of FIGS. 1, 2, 3, and 4 are embodiments of the LF display system 500. In other embodiments, the LF display system 500 comprises additional or fewer modules than those described herein. Similarly, the functions can be distributed among the modules and/or different entities in a different manner than is described here. Applications of the LF display system 500 are also discussed in detail below with regard to FIGS. 6-9.

The LF display assembly 510 provides holographic content in a holographic object volume that may be visible to viewers located within a viewing volume. The LF display assembly 510 may provide holographic content by executing display instructions received from the controller 520. The holographic content may include one or more holographic objects that are projected in front of an aggregate surface the LF display assembly 510, behind the aggregate surface of the LF display assembly 510, or some combination thereof. Generating display instructions with the controller 520 is described in more detail below.

The LF display assembly 510 provides holographic content using one or more LF display modules (e.g., any of the LF display module 110, the LF display system 200, and LF display module 300) included in an LF display assembly 510. For convenience, the one or more LF display modules may be described herein as LF display module 512. The LF display module 512 can be tiled to form a LF display assembly 510. The LF display modules 512 may be structured as various seamless surface environments (e.g., single sided, multi-sided, a wall of a presentation space, a curved surface, etc.). That is, the tiled LF display modules form an aggregate surface. As previously described, a LF display module 512 includes an energy device layer (e.g., energy device layer 220) and an energy waveguide layer (e.g., energy waveguide layer 240) that present holographic content. The LF display module 512 may also include an energy relay layer (e.g., energy relay layer 230) that transfers energy between the energy device layer and the energy waveguide layer when presenting holographic content.

The LF display module 512 may also include other integrated systems configured for energy projection and/or energy sensing as previously described. For example, a light field display module 512 may include any number of energy devices (e.g., energy device 340) configured to project and/or sense energy. For convenience, the integrated energy projection systems and integrated energy sensing systems of the LF display module 512 may be described herein, in aggregate, as the source/sensor system 514. The source/sensor system 514 is integrated within the LF display module 512, such that the source/sensor system 514 shares the same seamless energy surface with LF display module 512. In other words, the aggregate surface of an LF display assembly 510 includes the functionality of both the LF display module 512 and the source/sensor module 514. That is, an LF assembly 510 including a LF display module 512 with a source/sensor system 514 may project energy and/or sense energy while simultaneously projecting a light field. For example, the LF display assembly 510 may include a LF display module 512 and source/sensor system 514 configured as a dual-energy surface or bidirectional energy surface as previously described.

In some embodiments, the LF display system 500 augments the generated holographic content with other sensory content (e.g., coordinated touch, audio, or smell) using a sensory feedback system 570. The sensory feedback system 570 may augment the projection of holographic content by executing display instructions received from the controller 520. Generally, the sensory feedback system 570 includes any number of sensory feedback devices external to the LF display assembly 510 (e.g., sensory feedback system 442). Some example sensory feedback devices may include coordinated acoustic projecting and receiving devices, aroma projecting devices, temperature adjustment devices, force actuation devices, pressure sensors, transducers, etc. In some cases, the sensory feedback system 570 may have similar functionality to the light field display assembly 510 and vice versa. For example, both a sensory feedback system 570 and a light field display assembly 510 may be configured to generate a sound field. As another example, the sensory feedback system 570 may be configured to generate haptic surfaces while the light field display 510 assembly is not.

To illustrate, in an example embodiment of a light field display system 500, a sensory feedback system 570 may include one or more acoustic projection devices. The one or more acoustic projection devices are configured to generate one or more pressure waves that complement the holographic content when executing display instructions received from the controller 520. The generated pressure waves may be, e.g., audible (for sound), ultrasonic (for touch), or some combination thereof. Similarly, the sensory feedback system 570 may include an aroma projecting device. The aroma projecting device may be configured to provide scents to some, or all, of the target area when executing display instructions received from the controller. The aroma devices may be tied into an air circulation system (e.g., ducting, fans, or vents) to coordinate air flow within the target area. Further, the sensory feedback system 570 may include a temperature adjustment device. The temperature adjustment device is configured to increase or decrease temperature in some, or all, of the target area when executing display instructions received from the controller 520.

In some embodiments, the sensory feedback system 570 is configured to receive input from viewers of the LF display system 500. In this case, the sensory feedback system 570 includes various sensory feedback devices for receiving input from viewers. The sensor feedback devices may include devices such as acoustic receiving devices (e.g., a microphone), pressure sensors, joysticks, motion detectors, transducers, etc. The sensory feedback system may transmit the detected input to the controller 520 to coordinate generating holographic content and/or sensory feedback.

To illustrate, in an example embodiment of a light field display assembly, a sensory feedback system 570 includes a microphone. The microphone is configured to record audio produced by one or more viewers (e.g., gasps, screams, laughter, etc.). The sensory feedback system 570 provides the recorded audio to the controller 520 as viewer input. The controller 520 may use the viewer input to generate holographic content. Similarly, the sensory feedback system 570 may include a pressure sensor. The pressure sensor is configured to measure forces applied by viewers to the pressure sensor. The sensory feedback system 570 may provide the measured forces to the controller 520 as viewer input.

In some embodiments, the LF display system 500 includes a tracking system 580. The tracking system 580 includes any number of tracking devices configured to determine the position, movement and/or characteristics of viewers in the target area. Generally, the tracking devices are external to the LF display assembly 510. Some example tracking devices include a camera assembly ("camera"), a depth sensor, structured light, a LIDAR system, a card scanning system, or any other tracking device that can track viewers within a target area.

The tracking system 580 may include one or more energy sources that illuminate some or all of the target area with light. However, in some cases, the target area is illuminated with natural light and/or ambient light from the LF display assembly 510 when presenting holographic content. The energy source projects light when executing instructions received from the controller 520. The light may be, e.g., a structured light pattern, a pulse of light (e.g., an IR flash), or some combination thereof. The tracking system may project light in the visible band (~380 nm to 750 nm), in the infrared (IR) band (~750 nm to 1700 nm), in the ultraviolet band (10 nm to 380 nm), some other portion of the electromagnetic spectrum, or some combination thereof. A source may include, e.g., a light emitted diode (LED), a micro LED, a laser diode, a TOF depth sensor, a tunable laser, etc.

The tracking system 580 may adjust one or more emission parameter when executing instructions received from the controller 520. An emission parameter is a parameter that affects how light is projected from a source of the tracking system 580. An emission parameter may include, e.g., brightness, pulse rate (to include continuous illumination), wavelength, pulse length, some other parameter that affects how light is projected from the source assembly, or some combination thereof. In one embodiment, a source projects pulses of light in a time-of-flight operation.

The camera of the tracking system 580 captures images of the light (e.g., structured light pattern) reflected from the target area. The camera captures images when executing tracking instructions received from the controller 520. As previously described, the light may be projected by a source of the tracking system 580. The camera may include one or more cameras. That is, a camera may be, e.g., an array (1D or 2D) of photodiodes, a CCD sensor, a CMOS sensor, some other device that detects some or all of the light project by the tracking system 580, or some combination thereof. In an embodiment, the tracking system 580 may contain a light field camera external to the LF display assembly 510. In other embodiments, the cameras are included as part of the LF display source/sensor module 514 included in the LF display assembly 510. For example, as previously described, if the energy relay element of a light field module 512 is a bidirectional energy layer which interleaves both emissive displays and imaging sensors at the energy device layer 220, the LF display assembly 510 can be configured to simultaneously project light fields and record imaging information from the viewing area in front of the display. In one embodiment, the captured images from the bidirectional energy surface form a light field camera. The camera provides captured images to the controller 520.

The camera of the tracking system 580 may adjust one or more imaging parameters when executing tracking instructions received from the controller 520. An imaging parameter is a parameter that affects how the camera captures images. An imaging parameter may include, e.g., frame rate, aperture, gain, exposure length, frame timing, rolling shutter or global shutter capture modes, some other parameter that affects how the camera captures images, or some combination thereof.

The controller 520 controls the LF display assembly 510 and any other components of the LF display system 500. The controller 520 comprises a data store 522, a network interface 524, a tracking module 526, a viewer profiling module 528, and a light field processing engine 530. In other embodiments, the controller 520 comprises additional or fewer modules than those described herein. Similarly, the functions can be distributed among the modules and/or different entities in a different manner than is described here. For example, the tracking module 526 may be part of the LF display assembly 510 or the tracking system 580.

The data store 522 is a memory that stores information for the LF display system 500. The stored information may include display instructions, tracking instructions, emission parameters, imaging parameters, a virtual model of a target area, tracking information, images captured by the camera, one or more viewer profiles, calibration data for the light field display assembly 510, configuration data for the LF display system 510 including resolution and orientation of LF modules 512, desired viewing volume geometry, content for graphics creation including 3D models, scenes and environments, materials and textures, other information that may be used by the LF display system 500, or some combination thereof. The data store 522 is a memory, such as a read only memory (ROM), dynamic random access memory (DRAM), static random access memory (SRAM), or some combination thereof.

The network interface 524 allows the light field display system to communicate with other systems or environments via a network. In one example, the LF display system 500 receives holographic content from a remote light field display system via the network interface 524. In another example, the LF display system 500 transmits holographic content to a remote data store using the network interface 524.

The tracking module 526 tracks viewers viewing content presented by the LF display system 500. To do so, the tracking module 526 generates tracking instructions that control operation of the source(s) and/or the camera(s) of the tracking system 580, and provides the tracking instructions to the tracking system 580. The tracking system 580 executes the tracking instructions and provides tracking input to the tracking module 526.

The tracking module 526 may determine a position of one or more viewers within the target area (e.g., sitting in the seats of a presentation space). The determined position may be relative to, e.g., some reference point (e.g., a display surface). In other embodiments, the determined position may be within the virtual model of the target area. The tracked position may be, e.g., the tracked position of a viewer and/or a tracked position of a portion of a viewer (e.g., eye location, hand location, etc.). The tracking module 526 determines the position using one or more captured images from the cameras of the tracking system 580. The cameras of the tracking system 580 may be distributed about the LF display system 500, and can capture images in stereo, allowing for the tracking module 526 to passively track viewers. In other embodiments, the tracking module 526 actively tracks viewers. That is, the tracking system 580 illuminates some portion of the target area, images the target area, and the tracking module 526 uses time of flight and/or structured light depth determination techniques to determine position. The tracking module 526 generates tracking information using the determined positions.

The tracking module 526 may also receive tracking information as inputs from viewers of the LF display system 500. The tracking information may include body movements that correspond to various input options that the viewer is provided by the LF display system 500. For example, the tracking module 526 may track a viewer's body movement and assign any various movement as an input to the LF processing engine 530. The tracking module 526 may provide the tracking information to the data store 522, the LF processing engine 530, the viewer profiling module 528, any other component of the LF display system 500, or some combination thereof.

To provide context for the tracking module 526, consider an example embodiment of an LF display system 500 that displays a play in which a performer in the play scores a winning touchdown. In response to the scene, a viewer first pumps the air to show their excitement. The tracking system 580 may record the movement of the viewer's hands and transmit the recording to the tracking module 526. This may be achieved with a tracking system 580 comprised of cameras, depth sensors, or other devices that are external to the light field display assembly 510, or with a display surface which simultaneously projects light field images and records images, wherein the images recorded from the display surface may be light field images, or any combination of these devices, as previously described. The tracking module 526 tracks the motion of the viewer's hands in the recording and sends the input to LF processing engine 530. The viewer profiling module 528, as described below, determines that information in the image indicates that motion of the viewer's hands are associated with a positive response. Accordingly, if enough viewers are recognized having a positive response, the LF processing engine 530 generates appropriate holographic content to celebrate the touchdown. For example, the LF processing engine 530 may project confetti in the scene.

The LF display system 500 includes a viewer profiling module 528 configured to identify and profile viewers. The viewer profiling module 528 generates a profile of a viewer (or viewers) that views holographic content displayed by a LF display system 500. The viewer profiling module 528 generates a viewer profile based, in part, on viewer input and monitored viewer behavior, actions, and reactions. The viewer profiling module 528 can access information obtained from tracking system 580 (e.g., recorded images, videos, sound, etc.) and process that information to determine various information. In various examples, viewer profiling module 528 can use any number of machine vision or machine hearing algorithms to determine viewer behavior, actions, and reactions. Monitored viewer behavior can include, for example, smiles, cheering, clapping, laughing, fright, screams, excitement levels, recoiling, other changes in gestures, or movement by the viewers, etc.

More generally, a viewer profile may include any information received and/or determined about a viewer viewing holographic content from the LF display system. For example, each viewer profile may log actions or responses of that viewer to the content displayed by the LF display system 500. Some example information that can be included in a viewer profile are provided below.

In some embodiments, a viewer profile may describe a response of a viewer within the presentation space with respect to a person displayed in the holographic content (e.g., an athlete, a player, etc.). For example, a viewer profile may indicate that a viewer generally has positive response to athletes of particular teams that have a mascot of a Cowboy.

In some embodiments, a viewer profile can indicate characteristics of a viewer viewing a sporting event. For example, a viewer in a presentation space is wearing a sweatshirt displaying a university logo. In this case, the viewer profile can indicate that the viewer is wearing a sweatshirt and may prefer holographic content associated with the university whose logo is on the sweatshirt. More broadly, viewer characteristics that can be indicated in a viewer profile may include, for example, age, sex, ethnicity, clothing, viewing location in the presentation space, etc.

In some embodiments, a viewer profile can indicate preferences for a viewer in regard to desirable sporting event and/or presentation space characteristics. For example, a viewer profile may indicate that a viewer prefers only to view holographic content that is age appropriate for everyone in their family. In another example, a viewer profile may indicate holographic object volumes to display holographic content (e.g., on a wall) and holographic object volumes to not display holographic content (e.g., above their head). The viewer profile may also indicate that the viewer prefers to have haptic interfaces presented near them, or prefers to avoid them.

In another example, a viewer profile indicates a history of sporting events viewed for a particular viewer. For instance, viewer profiling module 528 determines that a viewer, or group of viewers, has previously attended a sporting event. As such the LF display system 500 may display holographic content that is different than the previous time the viewers attended the sporting event. As one example, a sporting event including holographic content may have three different holographic advertisements during game intermissions, and LF display system 500 may display different advertisements based on the viewers in attendance. In another example, each of the three advertisements may be presented to different viewing volumes in the same presentation space.

In some embodiments, a viewer profile may also describe characteristics and preferences for a group of viewers rather than a particular viewer. For example, viewer profiling module 528 may generate a viewer profile for the audience viewing a sporting event in the presentation space. In one example, viewer profiling module 528 creates a viewer profile for viewers viewing a sporting event such as beach volleyball. The profile indicates that 54.3% of the viewers are women between the age of 20 and 35 and have a positive response to the sporting event. The profile also indicates that the remaining 46.7% of the viewers are men between the ages of 20 and 35 and are having a mediocre response to the sporting event. Any of the previously described information and characteristics may be applied to a group of viewers.

The viewer profiling module 528 may also access a profile associated with a particular viewer (or viewers) from a third-party system or systems to build a viewer profile. For example, a viewer purchases a ticket for a sporting event using a third-party vendor that is linked to that viewer's social media account. Thus, the viewer's ticket is linked to his social media account. When the viewer enters a presentation space for the sporting event using their ticket, the viewer profiling module 528 can access information from his social media account to build (or augment) a viewer profile.

In some embodiments, the data store 522 includes a viewer profile store that stores viewer profiles generated, updated, and/or maintained by the viewer profiling module 528. The viewer profile can be updated in the data store at any time by the viewer profiling module 528. For example, in an embodiment, the viewer profile store receives and stores information regarding a particular viewer in their viewer profile when the particular viewer views holographic content provided by the LF display system 500. In this example, the viewer profiling module 528 includes a facial recognition algorithm that may recognize viewers and positively identify them as they view presented holographic content. To illustrate, as a viewer enters the target area of the LF display system 500, the tracking system 580 obtains an image of the viewer. The viewer profiling module 528 inputs the captured image and identifies the viewer's face using the facial recognition algorithm. The identified face is associated with a viewer profile in the profile store and, as such, all input information obtained about that viewer may be stored in their profile. The viewer profiling module may also utilize card identification scanners, voice identifiers, a radio-frequency identification (RFID) chip scanners, barcode scanners, etc. to positively identify a viewer.

In embodiments where the viewer profiling module 528 can positively identify viewers, the viewer profiling module 528 can determine each visit of each viewer to the LF display system 500. The viewer profiling module 528 may then store the time and date of each visit in the viewer profile for each viewer. Similarly, the viewer profiling module 528 may store received inputs from a viewer from any combination of the sensory feedback system 570, the tracking system 580, and/or the LF display assembly 510 each time they occur. The viewer profile system 528 may additionally receive further information about a viewer from other modules or components of the controller 520 which can then be stored with the viewer profile. Other components of the controller 520 may then also access the stored viewer profiles for determining subsequent content to be provided to that viewer.

The LF processing engine 530 generates holographic content comprised of light field data, as well as data for all of the sensory domains supported by a LF display system 500. For example, LF processing engine 530 may generate 4D coordinates in a rasterized format ("rasterized data") that, when executed by the LF display assembly 510, cause the LF display assembly 510 to present holographic content.

The LF processing engine 530 may access the rasterized data from the data store 522. Additionally, the LF processing engine 530 may construct rasterized data from a vectorized data set. Vectorized data is described below. The LF processing engine 530 can also generate sensory instructions required to provide sensory content that augments the holographic objects. As described above, sensory instructions may generate, when executed by the LF display system 500, haptic surfaces, sound fields, and other forms of sensory energy supported by the LF display system 500. The LF processing engine 530 may access sensory instructions from the data store 522, or construct the sensory instructions form a vectorized data set. In aggregate, the 4D coordinates and sensory data represent holographic content as display instructions executable by a LF display system to generate holographic and sensory content. More generally, holographic content can take the form of CG content with ideal light field coordinates, live action content, rasterized data, vectorized data, electromagnetic energy transported by a set of relays, instructions sent to a group of energy devices, energy locations on one or more energy surfaces, the set of energy propagation paths that are projected from the display surface, a holographic object that is visible to a viewer or an audience, and many other similar forms.

The amount of rasterized data describing the flow of energy through the various energy sources in a LF display system 500 is incredibly large. While it is possible to display the rasterized data on a LF display system 500 when accessed from a data store 522, it is untenable to efficiently transmit, receive (e.g., via a network interface 524), and subsequently display the rasterized data on a LF display system 500. Take, for example, rasterized data representing a short sporting event for holographic projection by a LF display system 500. In this example, the LF display system 500 includes a display containing several gigapixels and the rasterized data contains information for each pixel location on the display. The corresponding size of the rasterized data is vast (e.g., many gigabytes per second of sporting event display time), and unmanageable for efficient transfer over commercial networks via a network interface 524. The efficient transfer problem may be amplified for applications including live streaming of holographic content. An additional problem with merely storing rasterized data on data store 522 arises when an interactive experience is desired using inputs from the sensory feedback system 570 or the tracking module 526. To enable an interactive experience, the light field content generated by the LF processing engine 530 can be modified in real-time in response to sensory or tracking inputs. In other words, in some cases, LF content cannot simply be read from the data store 522.

Therefore, in some configurations, data representing holographic content for display by a LF display system 500 may be transferred to the LF processing engine 530 in a vectorized data format ("vectorized data"). Vectorized data may be orders of magnitude smaller than rasterized data. Further, vectorized data provides high image quality while having a data set size that enables efficient sharing of the data. For example, vectorized data may be a sparse data set derived from a denser data set. Thus, vectorized data may have an adjustable balance between image quality and data transmission size based on how sparse vectorized data is sampled from dense rasterized data. Tunable sampling to generate vectorized data enables optimization of image quality for a given network speed. Consequently, vectorized data enables efficient transmission of holographic content via a network interface 524. Vectorized data also enables holographic content to be live-streamed over a commercial network.

In summary, the LF processing engine 530 may generate holographic content derived from rasterized data accessed from the data store 522, vectorized data accessed from the data store 522, or vectorized data received via the network interface 524. In various configurations, vectorized data may be encoded by an encoder before data transmission, and decoded by a decoder within the LF controller 520 after reception. The encoder and decoder pair may be part of the same proprietary system codec. In some examples, the vectorized data is encoded for added data security and sporting event improvements related to data compression. For example, vectorized data received by the network interface may be encoded vectorized data received from a holographic streaming application. In some examples, vectorized data may require a decoder, the LF processing engine 530, or both of these to access information content encoded in vectorized data. The encoder and/or decoder systems may be available to customers or licensed to third-party vendors. Other example encoding and/or decoding schemes can be employed to transmit and/or present holographic content.

Vectorized data contains all the information for each of the sensory domains supported by a LF display system 500 in way that may support an interactive experience. For example, vectorized data for an interactive holographic experience may include any vectorized properties that can provide accurate physics for each of the sensory domains supported by a LF display system 500. Vectorized properties may include any properties that can be synthetically programmed, captured, computationally assessed, etc. A LF processing engine 530 may be configured to translate vectorized properties in vectorized data to rasterized data. The LF processing engine 530 may then project holographic content translated from the vectorized data using the LF display assembly 510. In various configurations, the vectorized properties may include one or more red/green/blue/alpha channel (RGBA)+depth images, multi view images with or without depth information at varying resolutions that may include one high-resolution center image and other views at a lower resolution, material properties such as albedo and reflectance, surface normals, other optical effects, surface identification, geometrical object coordinates, virtual camera coordinates, display plane locations, lighting coordinates, tactile stiffness for surfaces, tactile ductility, tactile strength, amplitude and coordinates of sound fields, environmental conditions, somatosensory energy vectors related to the mechanoreceptors for textures or temperature, audio, and any other sensory domain property. Many other vectorized properties are also possible.

The LF display system 500 may also generate an interactive viewing experience. That is, holographic content may be responsive to input stimuli containing information about viewer locations, gestures, interactions, interactions with holographic content, or other information derived from the viewer profiling module 528, and/or tracking module 526. For example, in an embodiment, a LF processing system 500 creates an interactive viewing experience using vectorized data of a real-time sporting event received via a network interface 524. In another example, if a holographic object needs to move in a certain direction immediately in response to a viewer interaction, the LF processing engine 530 may update the render of the scene so the holographic object moves in that required direction. This may require the LF processing engine 530 to use a vectorized data set to render light fields in real time based a 3D graphical scene with the proper object placement and movement, collision detection, occlusion, color, shading, lighting, etc., correctly responding to the viewer interaction. The LF processing engine 530 converts the vectorized data into rasterized data for presentation by the LF display assembly 510. The LF display system 500 may employ various other encoding/decoding techniques that allow the LF display system to present holographic content in an approximately real time.

The rasterized data includes holographic content instructions and sensory instructions (display instructions) representing the real-time sporting event. The LF display assembly 510 simultaneously projects holographic and sensory content of the real-time sporting event by executing the display instructions. The LF display system 500 monitors viewer interactions (e.g., vocal response, touching, etc.) with the presented real-time sporting event with the tracking module 526 and viewer profiling module 528. In response to the viewer interactions, the LF processing engine may create an interactive experience by generating additional holographic and/or sensory content for display to the viewers.

To illustrate, consider an example embodiment of an LF display system 500 including a LF processing engine 530 that generates a plurality of holographic objects representing balloons falling from the ceiling of a presentation space during a sporting event. A viewer may move to touch the holographic object representing the balloon. Correspondingly, the tracking system 580 tracks movement of the viewer's hands relative to the holographic object. The movement of the viewer is recorded by the tracking system 580 and sent to the controller 520. The tracking module 526 continuously determines the motion of the viewer's hand and sends the determined motions to the LF processing engine 530. The LF processing engine 530 determines the placement of the viewer's hand in the scene, adjusts the real-time rendering of the graphics to include any required change in the holographic object (such as position, color, or occlusion). The LF processing engine 530 instructs the LF display assembly 510 (and/or sensory feedback system 570) to generate a tactile surface using the volumetric haptic projection system (e.g., using ultrasonic speakers). The generated tactile surface corresponds to at least a portion of the holographic object and occupies substantially the same space as some or all of an exterior surface of the holographic object. The LF processing engine 530 uses the tracking information to dynamically instruct the LF display assembly 510 to move the location of the tactile surface along with a location of the rendered holographic object such that the viewer is given both a visual and tactile perception of touching the balloon. More simply, when a viewer views his hand touching a holographic balloon, the viewer simultaneously feels haptic feedback indicating their hand touches the holographic balloon, and the balloon changes position or motion in response to the touch. In some examples, rather than presenting and interactive balloon in a sporting event accessed from a data store 522, the interactive balloon may be received as part of holographic content received from a live-streaming application via a network interface 524. In other words, the holographic content displayed by the LF display system 500 may be a holographic content livestream.

LF processing engine 530 may provide holographic content to display to viewers in a presentation space before, during, and/or after a sporting event to augment the presentation space experience. The holographic content may be provided by the publisher of the sporting event, provided by the presentation space, provided by an advertiser, generated by a LF processing engine 530, etc. The holographic content may be content associated with the sporting event, the genre of the sporting event, the location of the presentation space, advertisements, etc. In any case, the holographic content may be stored in the data store 522, or streamed to the LF display system 500 in vectorized format through the network interface 524. For example, a sporting event may be shown in a presentation space augmented with LF display modules on the walls. The distributor of the sporting event may provide holographic content to present on the wall displays before the sporting event begins. The LF processing engine 530 accesses the holographic content and presents the accessed content from the displays on the walls of the presentation space before the sporting event begins. In another example, a presentation space with an LF display system 500 is located in San Francisco. The LF display system of a presentation space stores a holographic representation of the Golden Gate Bridge to present before a sporting event if no sporting event specific content is provided. Here, as no sporting event-specific holographic content is provided, the LF processing engine 530 accesses and presents the Golden Gate Bridge in the presentation space. In another example, an advertiser has provided holographic content of its products as advertisements to a presentation space to display after a sporting event. After the sporting event concludes, the LF processing engine 530 presents the advertisements to the viewers as they leave the presentation space. In other examples, as described below, a LF processing engine may dynamically generate holographic content to display on the walls of the theater.

The LF processing engine 500 may also modify holographic content to suit the presentation space that is presenting the holographic content. For example, not every presentation space is the same size, has the same number of seats, or has the same technical configuration. As such, LF processing engine 530 may modify holographic content such that it will be appropriately displayed in a presentation space. In an embodiment, the LF processing engine 530 may access a configuration file of a presentation space including the layout, resolution, field-of-view, other technical specifications, etc. of the presentation space. The LF processing engine 530 may render and present the holographic content based on information included in the configuration file.

The LF processing engine 530 may also create holographic content for display by the LF display system 500. Importantly, here, creating holographic content for display is different from accessing, or receiving, holographic content for display. That is, when creating content, the LF processing engine 530 generates entirely new content for display rather than accessing previously generated and/or received content. The LF processing engine 530 can use information from the tracking system 580, the sensory feedback system 570, the viewer profiling module 528, the tracking module 526, or some combination thereof, to create holographic content for display. In some examples, LF processing engine 530 may access information from elements of the LF display system 500 (e.g., tracking information and/or a viewer profile), create holographic content based on that information, and display the created holographic content using the LF display system 500 in response. The created holographic content may be augmented with other sensory content (e.g., touch, audio, or smell) when displayed by the LF display system 500. Further, the LF display system 500 may store created holographic content such that it may be displayed in the future.

Dynamic Content Generation for a LF Display System

In some embodiments, the LF processing engine 530 incorporates an artificial intelligence (AI) model to create holographic content for display by the LF display system 500. The AI model may include supervised or unsupervised learning algorithms including but not limited to regression models, neural networks, classifiers, or any other AI algorithm. The AI model may be used to determine viewer preferences based on viewer information recorded by the LF display system 500 (e.g., by tracking system 580) which may include information on a viewer's behavior.

The AI model may access information from the data store 522 to create holographic content. For example, the AI model may access viewer information from a viewer profile or profiles in the data store 522 or may receive viewer information from the various components of the LF display system 500. To illustrate, the AI model may determine a viewer enjoys seeing holographic content in which a performer wears a bow tie. The AI model may determine the preference based on a group of viewer's positive reactions or responses to previously viewed holographic content including a bow-tie wearing actor. That is, the AI model may create holographic content personalized to a set of viewers according to the learned preferences of those viewers. So, for example, the AI model may create bow-ties for actors displayed in the holographic content viewed by a group of viewers using the LF display system 500. The AI model may also store the learned preferences of each viewer in the viewer profile store of the data store 522. In some examples, the AI model may create holographic content for an individual viewer rather than a group of viewers.

One example of an AI model that can be used to identify characteristics of viewers, identify reactions, and/or generate holographic content based on the identified information is a convolutional neural network model with layers of nodes, in which values at nodes of a current layer are a transformation of values at nodes of a previous layer. A transformation in the model is determined through a set of weights and parameters connecting the current layer and the previous layer. For example, and AI model may include five layers of nodes: layers A, B, C, D, and E. The transformation from layer A to layer B is given by a function $W_1$, the transformation from layer B to layer C is given by $W_2$, the transformation from layer C to layer D is given by $W_3$, and the transformation from layer D to layer E is given by $W_4$. In some examples, the transformation can also be determined through a set of weights and parameters used to transform between previous layers in the model. For example, the transformation $W_4$ from layer D to layer E can be based on parameters used to accomplish the transformation $W_1$ from layer A to B.

The input to the model can be an image taken by tracking system 580 encoded onto the convolutional layer A and the output of the model is holographic content decoded from the output layer E. Alternatively or additionally, the output may be a determined characteristic of a viewer in the image. In this example, the AI model identifies latent information in the image representing viewer characteristics in the identification layer C. The AI model reduces the dimensionality of the convolutional layer A to that of the identification layer C to identify any characteristics, actions, responses, etc. in the image. In some examples, the AI model then increases the dimensionality of the identification layer C to generate holographic content.

The image from the tracking system 580 is encoded to a convolutional layer A. Images input in the convolutional layer A can be related to various characteristics and/or reaction information, etc. in the identification layer C. Relevance information between these elements can be retrieved by applying a set of transformations between the corresponding layers. That is, a convolutional layer A of an AI model represents an encoded image, and identification layer C of the model represents a smiling viewer. Smiling viewers in a given image may be identified by applying the transformations $W_1$ and $W_2$ to the pixel values of the image in the space of convolutional layer A. The weights and parameters for the transformations may indicate relationships between information contained in the image and the identification of a smiling viewer. For example, the weights and parameters can be a quantization of shapes, colors, sizes, etc. included in information representing a smiling viewer in an image. The weights and parameters may be based on historical data (e.g., previously tracked viewers).

Smiling viewers in the image are identified in the identification layer C. The identification layer C represents identified smiling viewers based on the latent information about smiling viewers in the image.

Identified smiling viewers in an image can be used to generate holographic content. To generate holographic content, the AI model starts at the identification layer C and applies the transformations $W_2$ and $W_3$ to the value of the given identified smiling viewers in the identification layer C. The transformations result in a set of nodes in the output layer E. The weights and parameters for the transformations may indicate relationships between an identified smiling viewers and specific holographic content and/or preferences. In some cases, the holographic content is directly output from the nodes of the output layer E, while in other cases the content generation system decodes the nodes of the output layer E into a holographic content. For example, if the output is a set of identified characteristics, the LF processing engine can use the characteristics to generate holographic content.

Additionally, the AI model can include layers known as intermediate layers. Intermediate layers are those that do not correspond to an image, identifying characteristics/reactions, etc., or generating holographic content. For example, in the given example, layer B is an intermediate layer between the convolutional layer A and the identification layer C. Layer D is an intermediate layer between the identification layer C and the output layer E. Hidden layers are latent representations of different aspects of identification that are not observed in the data, but may govern the relationships between the elements of an image when identifying characteristics and generating holographic content. For example, a node in the hidden layer may have strong connections (e.g., large weight values) to input values and identification values that share the commonality of "laughing people smile." As another example, another node in the hidden layer may have strong connections to input values and identification values that share the commonality of "scared people scream." Of course, any number of linkages are present in a neural network. Additionally, each intermediate layer is a combination of functions such as, for example, residual blocks, convolutional layers, pooling operations, skip connections, concatenations, etc. Any number of intermediate layers B can function to reduce the convolutional layer to the identification layer and any number of intermediate layers D can function to increase the identification layer to the output layer.

In one embodiment, the AI model includes deterministic methods that have been trained with reinforcement learning (thereby creating a reinforcement learning model). The model is trained to increase the quality of the sporting event using measurements from tracking system 580 as inputs, and changes to the created holographic content as outputs.

Reinforcement learning is a machine learning system in which a machine learns 'what to do'—how to map situations to actions—so as to maximize a numerical reward signal. The learner (e.g. LF processing engine 530) is not told which actions to take (e.g., generating prescribed holographic content), but instead discovers which actions yield the most reward (e.g., increasing the quality of holographic content by making more people cheer) by trying them. In some cases, actions may affect not only the immediate reward but also the next situation and, through that, all subsequent rewards. These two characteristics—trial-and-error search and delayed reward—are two distinguishing features of reinforcement learning.

Reinforcement learning is defined not by characterizing learning methods, but by characterizing a learning problem. Basically, a reinforcement learning system captures those important aspects of the problem facing a learning agent interacting with its environment to achieve a goal. That is, in the example of generating a song for a performer, the reinforcement learning system captures information about viewers in the presentation space (e.g., age, disposition, etc.). Such an agent senses the state of the environment and takes actions that affect the state to achieve a goal or goals (e.g., creating a pop song for which the viewers will cheer). In its most basic form, the formulation of reinforcement learning includes three aspects for the learner: sensation, action, and goal. Continuing with the song example, the LF processing engine 530 senses the state of the environment with sensors of the tracking system 580, displays holographic content to the viewers in the environment, and achieves a goal that is a measure of the viewer's reception of that song.

One of the challenges that arises in reinforcement learning is the trade-off between exploration and exploitation. To increase the reward in the system, a reinforcement learning agent prefers actions that it has tried in the past and found to be effective in producing reward. However, to discover actions that produce reward, the learning agent selects actions that it has not selected before. The agent 'exploits' information that it already knows in order to obtain a reward, but it also 'explores' information in order to make better action selections in the future. The learning agent tries a variety of actions and progressively favors those that appear to be best while still attempting new actions. On a stochastic task, each action is generally tried many times to gain a reliable estimate to its expected reward. For example, if the LF processing engine creates holographic content that the LF processing engine knows will result in a viewer laughing after a long period of time, the LF processing engine may change the holographic content such that the time until a viewer laughs decreases.

Further, reinforcement learning considers the whole problem of a goal-directed agent interacting with an uncertain environment. Reinforcement learning agents have explicit goals, can sense aspects of their environments, and can choose actions to receive high rewards (i.e., a roaring crowd). Moreover, agents generally operate despite significant uncertainty about the environment they face. When reinforcement learning involves planning, the system addresses the interplay between planning and real-time action selection, as well as the question of how environmental elements are acquired and improved. For reinforcement learning to make progress, important sub problems have to be isolated and studied, the sub problems playing clear roles in complete, interactive, goal-seeking agents.

The reinforcement learning problem is a framing of a machine learning problem where interactions are processed and actions are carried out to achieve a goal. The learner and decision-maker is called the agent (e.g., LF processing engine 530). The thing it interacts with, comprising everything outside the agent, is called the environment (e.g., viewers in a presentation space, etc.). These two interact continually, the agent selecting actions (e.g., creating holographic content) and the environment responding to those actions and presenting new situations to the agent. The environment also gives rise to rewards, special numerical values that the agent tries to maximize over time. In one context, the rewards act to maximize viewer positive reactions to holographic content. A complete specification of an environment defines a task which is one instance of the reinforcement learning problem.

To provide more context, an agent (e.g., LF processing engine 530) and environment interact at each of a sequence of discrete time steps, i.e. t=0, 1, 2, 3, etc. At each time step t the agent receives some representation of the environment's state $s_t$ (e.g., measurements from tracking system 580). The states $s_t$ are within S, where S is the set of possible states. Based on the state $s_t$ and the time step t, the agent selects an action at (e.g., making the performer do the splits). The action at is within $A(s_t)$, where $A(s_t)$ is the set of possible actions. One time state later, in part as a consequence of its action, the agent receives a numerical reward $r_{t+1}$. The states $r_{t+1}$ are within R, where R is the set of possible rewards. Once the agent receives the reward, the agent selects in a new state $s_{t+1}$.

At each time step, the agent implements a mapping from states to probabilities of selecting each possible action. This mapping is called the agent's policy and is denoted $\pi_t$ where $\pi_t(s,a)$ is the probability that $a_t$=a if $s_t$=s. Reinforcement learning methods can dictate how the agent changes its policy as a result of the states and rewards resulting from agent actions. The agent's goal is to maximize the total amount of reward it receives over time.

This reinforcement learning framework is flexible and can be applied to many different problems in many different ways (e.g. generating holographic content). The framework proposes that whatever the details of the sensory, memory, and control apparatus, any problem (or objective) of learning goal-directed behavior can be reduced to three signals passing back and forth between an agent and its environment: one signal to represent the choices made by the agent (the actions), one signal to represent the basis on which the choices are made (the states), and one signal to define the agent's goal (the rewards).

Of course, the AI model can include any number of machine learning algorithms. Some other AI models that can be employed are linear and/or logistic regression, classification and regression trees, k-means clustering, vector quantization, etc. Whatever the case, generally, the LF processing engine 530 takes an input from the tracking module 526 and/or viewer profiling module 528 and a machine learning model creates holographic content in response. Similarly, the AI model may direct the rendering of holographic content.

In an example, the LF processing engine 530 creates a virtual athlete. The LF processing engine 530 creates the virtual athlete using information included in the viewer profiles stored in the data store 522. For example, information included in stored viewer profiles indicates that a large number of viewers enjoy high quality soccer from a woman athlete in her early thirties with artificially colored hair. As such, the LF processing engine 530 creates an athlete that is displayed by the LF display system 500 as a female soccer player. More explicitly, LF processing engine 530 accesses the viewer profiles of the viewers in a presentation space. LF processing engine 530 parameterizes (e.g., quantifies) information in each viewer profile. For example, LF processing engine 530 can quantify characteristics such as the age, location, sex, etc. of a viewer. Further, LF processing engine

530 can parameterize other information included in a viewer profile. For example, if a viewer profile indicates that a viewer has attended four sporting events of female athletes, the content creation module may quantify this tendency (e.g., generates a score indicating a viewer's interest in female athletes). LF processing engine 530 inputs the parameterized user profiles into an AI model (e.g., a neural network) configured to generate characteristics of a virtual athlete based on input parameters and receives characteristics for the athlete in response. LF processing engine 530 then inputs the characteristics for the virtual athlete into an AI model (e.g., a procedural generation algorithm) configured to generate an athlete given a set of characteristics and generates a virtual female athlete. Further the LF processing engine 530 can create holographic content (e.g., abilities, sporting events, teams, uniforms, etc.) that would adhere to the persona of the virtual athlete. For example, the content generation module 530 may create a training regimen for the virtual athlete adherent to her playing style. More explicitly, LF processing engine 530 may access the characteristics of the virtual athlete and information about the viewers and input that information into an AI model (e.g., a recurrent neural network "RNN"). Again, the characteristics and information may be parameterized (e.g., using a classification and regression tree) and input into the RNN. Here, the RNN may be trained using training regimens with similar input parameters. As such, the RNN generates a training regimen for the virtual athlete for the viewers in the presentation space that shares similar characteristics to the training regimens of other female soccer athletes.

LF processing engine 530 can create holographic content based on a sporting event being shown in the presentation space. For example, a sporting event being shown in the presentation space may be associated with a set of metadata describing the sporting event's characteristics. The metadata may include, for example, the setting, genre, coaches, players, statistics, sporting event type, themes, titles, run-times, etc. LF processing engine 530 may access any of the metadata describing the sporting event and generate holographic content to present in the presentation space in response. For example, a sporting event titled "The Excellent Bowl" is a play about to be played in a presentation space augmented with a LF display system 500. The LF processing engine 530 accesses the metadata of the sporting event to create holographic content for the walls of the presentation space before the sporting event begins. Here, the metadata includes a vibrant stadium setting appropriate for The Excellent Bowl. The LF processing engine 530 inputs the metadata into an AI model and receives holographic content to display on the walls of the presentation space in response. In this example, the LF processing engine 530 creates a beachside sunset to display on the walls of the presentation space before the sporting event begins to play.

In an example, the LF processing engine 530 creates holographic content based on the viewers present at a presentation space including a LF display system 500. For example, a group of viewers enters a presentation space to view a sporting event augmented by holographic content displayed by the LF display system 500. Viewer profiling module 528 generates a viewer profile for the viewers in the presentation space and an aggregate viewer profile representing all of the viewers in the presentation space. LF processing engine 530 accesses the aggregate viewer profile and creates holographic content to display to the viewers in the presentation space. For example, the viewers in a presentation space are a group of fans viewing a team working towards a championship, and, therefore, the aggregate viewer profile includes information indicating that they may enjoy holographic content commensurate with super-fans for a sports team (e.g., through parameterization and input into an AI model). As such, the LF processing engine 530 generates holographic content such that the presentation space is a more rowdy atmosphere (e.g., foam fingers, chants, noise makers, etc.).

In some examples, the LF processing engine 530 may create holographic content based on previously existing content. Here, previously existing can be a previously existing team, athlete, etc. For example, a viewer's favorite athlete is "Baby Ruthie" and they wish to view a baseball game starring their idol. As such, LF processing engine 530 creates augmented content for a sporting event of the Babie Ruthie smashing home run after home run. In this example, LF processing engine 530 may access existing box-scores, images, and statistics of Babie Ruthie (e.g., stored in data store 522) and use that content to create sporting event content for display by the LF display system 500. More explicitly, the content creation system can access the previous content from the data store 522. The LF processing engine 530 inputs favorite athletes, favorite teams, and favorite plays, and any other viewer data into an AI model (e.g., a procedural generation algorithm) configured to create, for example, a collage of multiple favorite athletes making plays, and in response the AI model outputs this holographic content to show during a sporting event. In some instances, because LF processing engine 530 is creating holographic content based on copyrighted content, the viewers and/or the LF processing engine 530 may pay a fee to the copyright holders.

In an example, the LF processing engine 530 creates holographic content based on the responses of viewers viewing a sporting event. For example, viewers in a presentation space are viewing a sporting event in a presentation space augmented by a LF display system 500. The tracking module 526 and the viewer profiling module 528 monitor the reaction of the viewers viewing the sporting event. For example, tracking module 526 may obtain images of viewers as they view the sporting event. Tracking module 526 identifies the viewer, and viewer profiling module 528 may use machine vision algorithms to determine a reaction of the viewer based on information included in the image. For example, an AI model can be used to identify if a viewer viewing the sporting event is smiling and, accordingly, viewer profiling module 528 can indicate in the viewer profile if the viewer has a positive or negative response to the sporting event based on the smile. Other reactions may also be determined. The tracking module may determine information about viewers including the position of the viewer, a movement of the viewer, a gesture of the viewer, an expression of the viewer, an age of the viewer, a sex of the viewer, an ethnicity of the viewer, or a clothing worn by the viewer. This information may be shared with the viewer profiling module 528 to generate a viewer profile.

The LF processing engine 530 may create holographic content based on previously existing or provided advertisement content. That is, for example, the LF processing engine 530 can request an advertisement from a network system via network interface 524, the network system provides the holographic content in response, and the LF processing engine 530 creates holographic content for display including the advertisement. Some examples of advertisement can include, products, text, videos, etc. Advertisements may be presented to specific viewing volumes based on the viewers in that viewing volume. Similarly, holographic content may augment a sporting event with an advertisement (e.g., a product placement). Most generally, the LF processing engine 530 can create advertisement content based on any of the characteristics and/or reactions of the viewers in the presentation space as previously described.

The preceding examples of creating content are not limiting. Most broadly, LF processing engine 530 creates holographic content for display to viewers of a LF display system 500. The holographic content can be created based on any of the information included in the LF display system 500.

Holographic Content Distribution Networks

Figure 5B:
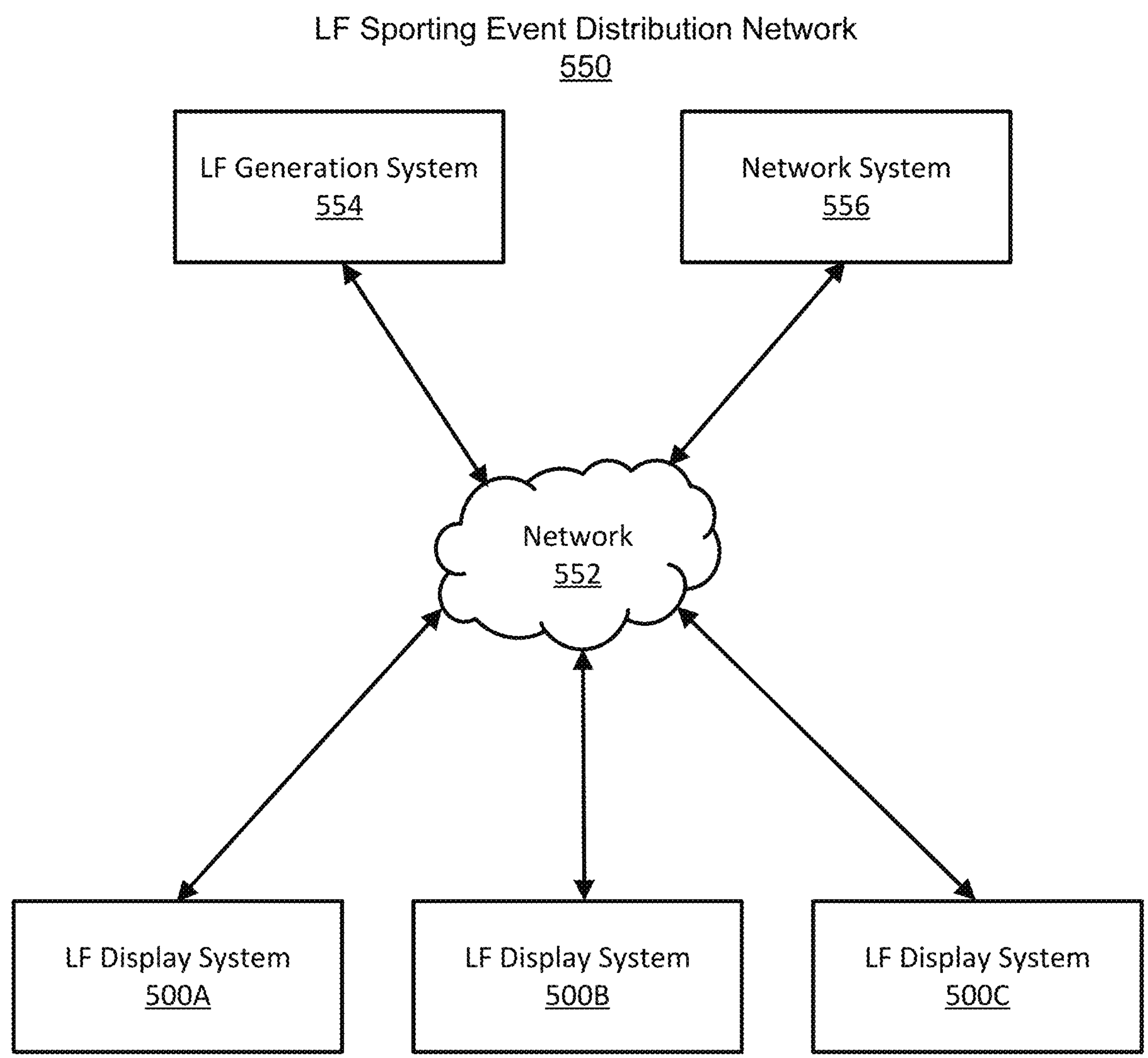
FIG. 5B illustrates an example LF film network 550, in accordance with one or more embodiments.

FIG. 5B illustrates an example LF sporting event network 550, in accordance with one or more embodiments. One or more LF display systems may be included in the LF sporting event network 550. The LF sporting event network 550 includes any number of LF display systems (e.g., 500A, 500B, and 500C), a LF generation system 554, and a networking system 556 that are coupled to each other via a network 552. The network may be a satellite network, an IP-based network, or a cable system network. In other embodiments, the LF sporting event network 550 comprises additional or fewer entities than those described herein. Similarly, the functions can be distributed among the different entities in a different manner than is described here.

In the illustrated embodiment, the LF sporting event network 550 includes LF display systems 500A, 500B, and 500C that may receive holographic content via the network 552 and display the holographic content to viewers. The LF display systems 500A, 500B, and 500C are collectively referred to as LF display systems 500.

The LF generation system 554 is a system that generates holographic content for display in a sporting event presentation space including a LF display system. In other words, the LF generation system is configured to generate any of the LF content described herein. The holographic content may be a sporting event or may be holographic content that augments a traditional sporting event.

In one example, the augmenting content is audio content that can be displayed concurrently to the holographic content. For example, the audio content may include an announcer, a music track, a jingle, a sound effect, or a translation.

In another example, the augmenting content is any of an overlay for a sporting area in the sporting arena, an informational overlay, or an augmentation of holographic content included in a holographic content livestream.

In another example, the augmenting content is an advertisement comprising any holographic, video, audio, or tactile content. In this case the advertisement may be based on any of a location of the LF display system presenting the advertisement, the sporting arena where the content was recorded and/or is being presented, a sponsor of the sporting event, or a configuration of the LF display system. In some cases, for viewers paying a higher fee for viewing the holographic content, viewer advertisements may be inserted into the holographic livestream.

A LF generation system 554 may include a light field recording assembly comprised of any number of sensors and/or processors to record energy data of an event, as well as a processing engine configured to convert this recorded energy data into holographic content. For example, the sensors of the light field recording assembly can include cameras for recording images, microphones for recording audio, pressure sensors for recording interactions with objects, etc. In some examples, the light field recording assembly of the LF generation system 554 includes one or more recording modules (e.g., a LF display module configured to record energy data from an event, or a simple 2D camera to capture images of an event) positioned around an area (e.g., a sporting event presentation space) to record an event from multiple viewpoints. In this case, the processing engine of the LF generation system 554 is configured to convert the energy from multiple viewpoints into holographic content. In some examples, the light field recording assembly includes two or more two-dimensional recording systems, which are used by the processing engine to convert multiple viewpoints of an event into three-dimensional holographic content. The light field recording assembly can also include other sensors, such as, for example, depth sensors and/or plenoptic cameras.

More broadly, the LF generation system 554 generates holographic content for display in a presentation space by using any recorded sensory data or synthetic data of an event that may be projected by a LF display system when showing a sporting event. For example, the sensory data may include recorded audio, recorded images, recorded interactions with objects, etc. Many other types of sensory data may be used. To illustrate, the recorded visual content may include: 3D graphics scenes, 3D models, object placement, textures, color, shading, and lighting; 2D sporting event data which can be converted to a holographic form using an AI model and a large data set of similar sporting event conversions; multi-view camera data from a camera rig with many cameras with or without a depth channel; plenoptic camera data; CG content; or other types of recorded sensory data of an event as described herein.

In various examples, the sporting event that is recorded with one or more sensors over one or more energy domains may be any type of sporting event. The sporting event presentation space may include one or more of a field, a portion of an arena, etc.

In some configurations, the LF generation system 554 may use a proprietary encoder to perform the encoding operation that reduces the sensory data recorded for a sporting event into a vectorized data format as described above. That is, encoding data to vectorized data may include image processing, audio processing, or any other computations that may result in a reduced data set that is easier to transmit over the network 552. The encoder may support formats used by sporting event-making industry professionals. In other configurations, the LF generation system may transmit the sporting event content to the network system 556 and or LF display system without encoding the content.

Each LF display system (e.g., 500A, 500B, 500C) may receive the encoded data from the network 552 via a network interface 524. In this example, each LF display system includes a decoder to decode the encoded LF display data. More explicitly, a LF processing engine 530 generates rasterized data for the LF display assembly 510 by applying decoding algorithms provided by the decoder to the received encoded data. In some examples, the LF processing engine may additionally generate rasterized data for the LF display assembly using input from the tracking module 526, the viewer profiling module 528, and the sensory feedback system 570 as described herein. Rasterized data generated for the LF display assembly 510 reproduces the holographic content recorded by the LF generation system 554. Importantly, each LF display system 500A, 500B, and 500C generates rasterized data suitable for the particular configuration of the LF display assembly in terms of geometry, resolution, etc. In some configurations, the encoding and decoding process is part of a proprietary encoding/decoding system pair (or 'codec') which may be offered to display customers or licensed by third parties. In some instances, the encoding/decoding system pair may be implemented as a proprietary API that may offer content creators a common programming interface.

In some configurations, various systems in the LF sporting event network 550 (e.g., LF display system 500, the LF generation system 554, etc.) may have different hardware configurations. Hardware configurations can include arrangement of physical systems, energy sources, energy sensors, haptic interfaces, sensory capabilities, resolutions, fields-of-view, LF display module configurations, or any other hardware description of a system in the LF sporting event network 550. Each hardware configuration may generate, or utilize, sensory data in different data formats. As such, a decoder system may be configured to decode encoded data for the LF display system on which it will be presented. For example, a LF display system (e.g., LF display system 500A) having a first hardware configuration receives encoded data from a LF generation system (e.g., LF generation system 554) having a second hardware configuration. The decoding system accesses information describing the first hardware configuration of the LF display system 500A. The decoding system decodes the encoded data using the accessed hardware configuration such that the decoded data can be processed by the LF processing engine 530 of the receiving LF display system 500A. The LF processing engine 530 generates and presents rasterized content for the first hardware configuration despite being recorded in the second hardware configuration. In a similar manner, holographic content recorded by the LF generation system 554 can be presented by any LF display system (e.g., LF display system 500B, LF display system 500C) whatever the hardware configurations. Various other aspects that may be included in the hardware configuration may include: a resolution, a number of projected rays per degree, a field of view, a deflection angle on the display surface, and a dimensionality of the display surface, etc. Additionally, the hardware configuration may also include, a number of display panels of the LF display assembly, a relative orientation of the display panels, a height of the display panels, a width of the display panels, and a layout of the display panels.

Similarly, various systems in the LF sporting event network 550 may have different geometric orientations. Geometric orientations reflect the physical size, layout, and arrangement of the various modules and system included in an LF display system. As such, a decoder system may be configured to decode encoded data for the LF display system in the geometric configuration on which it will be presented. For example, a LF display system (e.g., LF display system 500A) having a first geometric configuration receives encoded data from a LF generation system (e.g., LF generation system 554) having a second geometric configuration. The decoding system accesses information describing the first geometric configuration of the LF display system 500A. The decoding system decodes the encoded data using the accessed geometric configuration such that the decoded data can be processed by the LF processing engine 530 of the receiving LF display system 500A. The LF processing engine 530 generates and presents content for the first geometric configuration despite being recorded in the second geometric configuration. In a similar manner, holographic content recorded by the LF generation system 554 can be presented by any LF display system (e.g., LF display system 500B, LF display system 500C) whatever the geometric configurations. Various other aspects that may be included in the geometric configuration may include: a number of display panels (or surfaces) of the LF display assembly, a relative orientation of the display panels.

Similarly, various presentation spaces in the LF sporting event network 550 may have different configurations. Presentation space configurations reflect any of the number and/or position of holographic object volumes, the number and/or position of viewing volumes, and a number and/or position of viewing locations relative to a LF display system. As such, a decoder system may be configured to decode encoded data for the LF display system in the presentation space in which it will be presented. For example, a LF display system (e.g., LF display system 500A) having in a first presentation space receives encoded data from a LF generation system (e.g., LF generation system 554) recorded in a different presentation space (or some other space). The decoding system accesses information describing the presentation space. The decoding system decodes the encoded data using the accessed presentation space configuration such that the decoded data can be processed by the LF processing engine 530 installed in the presentation space. The LF processing engine 530 generates and presents content for the presentation space despite being recorded in a different location.

The network system 556 is any system configured to manage the transmission of holographic content between systems in a LF sporting event network 550. For example, the network system 556 may receive a request for holographic content from a LF display system 500A and facilitate transmission of the holographic content to the LF display system 500A from the LF generation system 554. The network system 556 may also store holographic content, viewer profiles, holographic content, etc. for transmission to, and/or storage by, other LF display systems 500 in the LF sporting event network 550. The network system 556 may also include a LF processing engine 530 that can create holographic content as previously described.

The network system 556 may include a digital rights management (DRM) module to manage the digital rights of the holographic content. For example, the LF generation system 554 may transmit the holographic content to the network system 556 and the DRM module may encrypt the holographic content using a digital encryption format. In other examples, the LF generation system 554 encodes recorded light field data into a holographic content format that can be managed by the DRM module. The network system 556 may provide a key to the digital encryption key to a LF display system such that each LF display system 500 can decrypt and, subsequently, display the holographic content to viewers. Most generally, the network system 556 and/or the LF generation system 554 encodes the holographic content and a LF display system may decode the holographic content.

The network system 556 may act as a repository for previously recorded and/or created holographic content. Each piece of holographic content may be associated with a transaction fee that, when received, causes the network system 556 to transmit the holographic content to the LF display system 500 that provides the transaction fee. For example, A LF display system 500A may request access to the holographic content via the network 552. The request includes a transaction fee for the holographic content. In response, network system 556 transmits the holographic content to the LF display system for display to viewers. In other examples, the network system 556 can also function as a subscription service for holographic content stored in the network system. In another example, LF generation system 554 is recording light field data of a sporting event in real-time and generating holographic content representing that sporting event. A LF display system 500 transmits a request for the holographic content to the LF generation system 554. The request includes a transaction fee for the holographic content. In response, the LF generation system 554 transmits the holographic content for concurrent display on the LF display system 500. The network system 556 may act as a mediator in exchanging transaction fees and/or managing holographic content data flow across the network 552. Additionally, in some cases, the network system is capable of modifying holographic content such that it is presentable by the LF display system receiving the holographic content.

In some examples, the network system 556 may be a local distribution hub. That is a network system 556 responsible for distributing a holographic content to LF display system in a local market. For example, the local distribution hub may be a Dallas station responsible for distributing holographic content to LF display systems 500 in the Dallas area. In this case, the network system 556 may augment the holographic content with additional holographic content, audio content, video content, and/or tactile content.

The network 552 represents the communication pathways between systems in a LF sporting event network 550. In one embodiment, the network is the Internet, but can also be any network, including but not limited to a local area network (LAN), a metropolitan area network (MAN), a wide area network (WAN), a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

III. Example Arenas

FIGS. 6A-9B illustrate several example presentation spaces that may display holographic content using a LF display system (e.g., LF display system 500). The holographic content can be a recorded sporting event, a sporting event occurring concurrently in another arena, and/or holographic content that augments a presented sporting event. In this disclosure, this content is referred to as holographic sporting event content, or simply holographic sporting content. Within a presentation space, any number of viewers are located at viewing locations within any number of viewing volumes. The LF display system is configured to display the holographic sporting content in a holographic object volume ("holographic sporting event volume") such that viewers in the viewing volume(s) perceive this holographic sporting content. In this disclosure we often use the terms "holographic sporting event volume," and "holographic object volume," interchangeably, to refer to the region of space where the holographic sporting content is projected (e.g. the holographic object volume 255 shown in FIG. 2B). Generally, a LF display system in a venue includes an array of light field modules 210 around the holographic sporting event volume that generate a seamless multisided LF display. As such, the holographic sporting event volume may be the aggregate holographic object volume of the array of LF display modules 210.

Figure 6:
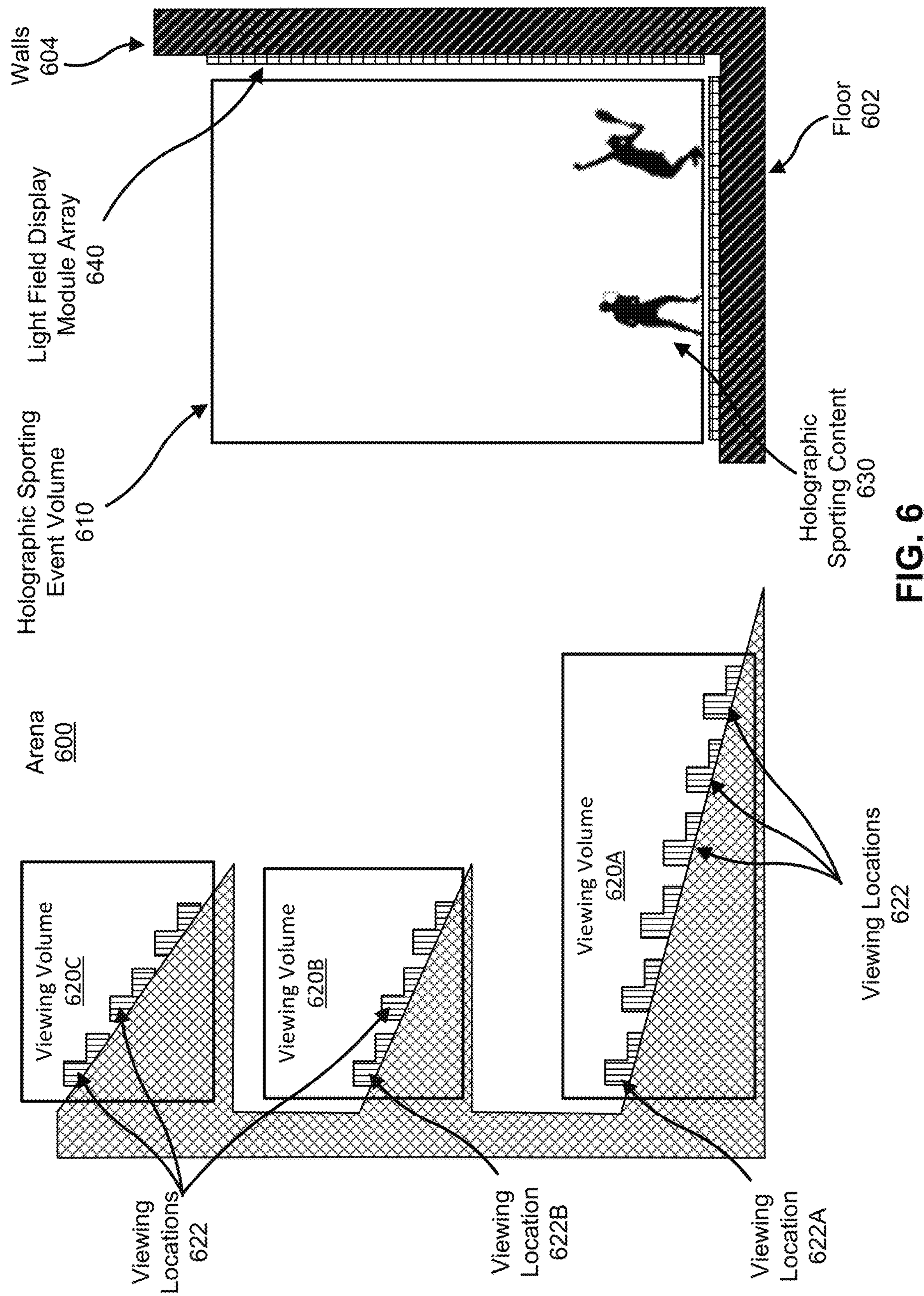
FIG. 6 illustrates a side view of a venue 600 which is a traditional theater which has been augmented with a LF display system, in accordance with one or more embodiments.

FIG. 6 illustrates a side view of a presentation space which is a traditional arena 600 which has been augmented with a LF display system, in accordance with one or more embodiments. In the arena 600, a back wall and the floors are lined with an array 640 of LF display modules such that the area above the floor is the holographic sporting event volume 610 of the LF display system. In some examples, the arena 600 may include elements in the holographic sporting event volume that allow for easier presentation of holographic sporting content. For example, a holographic sporting event volume may include a tennis court such that the LF display system need not render the court when presenting a tennis match. The holographic sporting event volume 610 (e.g., holographic object volume 255) is illustrated as a bounded square for clarity, but the illustrated holographic sporting event volume 610 is only a portion of the actual holographic sporting event volume. For example, the holographic sporting event volume may extend into the back wall or the floor 602. In FIG. 6, the LF display system is an embodiment of the LF display system 500. Further, the LF display modules in the array 640 are an embodiment of the LF display assembly 510.

Here, the arena 600 is three tiered, but could include any number of tiers. Each tier includes a number of viewing locations (e.g., viewing location 622A, 622B) for viewers to view holographic sporting event content 630 in the holographic sporting event volume 610. The viewing locations 622 in each tier are included in a viewing volume (e.g., 620A, 620B, and 620C) of the LF display system. The LF display system may display the same, or different, sporting event content 630 to viewers in each viewing sub-volume 620 (similar to viewing sub-volumes 290 in FIG. 2B). For example, as described below, viewers in the viewing locations 622A located in the viewing volume 620A of the bottom tier may see different sporting event content 630 than viewers in the viewing location 622B in the viewing volume 620B of the middle tier.

In other embodiments, the arena 600 may configured in a different manner. For example, the walls and floor may take some other shape appropriate for the sporting content to be presented. Any of the surfaces in the arena 600 may be included in the array 640 of LF display modules. Additionally, the arena 600 may have additional tiers and viewing volumes and those tiers and viewing volumes may be arranged in any number of configurations.

As a contextual example, the illustrated arena 600 is a presentation space in San Francisco billed to concurrently show the finals to a tennis match "Bumbledon." Notably, however, the tennis match is occurring in London, England. The arena in London includes a LF generation system (e.g., LF generation system 554) for recording and transmitting the tennis match as holographic sporting event content 630 to other venues via a network (e.g., via network 552). The arena 600 in San Francisco includes a LF display system configured to display the received holographic sporting event content 630 to viewers at viewing locations 622 in the viewing sub-volumes 620. A transaction fee is paid (e.g., to network system 556 or LF generation system 554) to receive the sporting event content. In various examples, the owner of the arena 600, attendees to the arena 600, a sporting event manager, or any other agent may pay the fee. The holographic sporting event content 630 allows viewers in San Francisco to perceive the tennis match as if they were viewing the match live in the holographic sporting event volume 610 in front of them. This allows viewers in San Francisco to see the live sporting event in a nearly identical way to the viewers in London, without travelling to London.

In some embodiments, the venue 600 charges an entrance fee to see the tennis match live-stream displayed by the LF display system 500. Each viewing location 622 can have a different entrance fee and, generally, the entrance fee for the bottom viewing volume 620A is more expensive than the top viewing volume 620C. The LF display system can display different holographic sporting event content 630 to each viewing volume 620 based on the entrance fee for the viewing volumes 620. For example, fully rendering the match in San Francisco may be costlier (e.g., processing power, energy, etc.) than partially rendering the match. As such, a LF processing engine (e.g., LF processing engine 530) may only display a portion of the sporting content to the viewing volume 620C on the top tier of the theater while playing all of the sporting content 630 to the viewing volume 620A on the bottom tier of the theater. For example, when displaying only a portion of the holographic sporting event content 630, the LF processing engine may only display sporting event content 630 in a portion of the holographic sporting event volume 610 rather than the whole holographic sporting event volume 610, the LF processing engine may remove aspects of the holographic sporting event content 630 (e.g., cheerleaders, portions of the fans or spectators, etc.), the LF processing engine 530 may render the holographic sporting event content 630 at a lower resolution for the top viewing volume 620C than the bottom viewing volume 620A, and the like.

Alternatively or additionally, LF processing engine 530 can create holographic content to augment the holographic sporting event content 630 based on the entrance fee for the viewing volumes 620. For example, the LF processing engine may create (or access from a network system 556) an advertisement to display concurrently with the sporting content 630. The advertisement may be based on the information obtained by a viewer profiling system (e.g., viewer profiling system 590) or a tracking system (e.g., tracking system 580). For example, the LF processing engine may access viewer profiles including viewer characteristics and responses to holographic content. The LF processing engine accesses an advertisement from the data store (e.g., data store 522) that is associated with the characteristics and responses of the viewers and displays that advertisement. The venue may receive payment from the advertiser for displaying the advertisement when displaying the holographic sporting content 630. In another example, rather than an overtly displayed advertisement, LF processing engine can augment the holographic sporting event content 630 with sponsored holographic content (e.g., product placements). For example, LF processing engine may replace courtside advertisements for viewers in London with advertisements targeting viewers in San Francisco.

Figure 7:
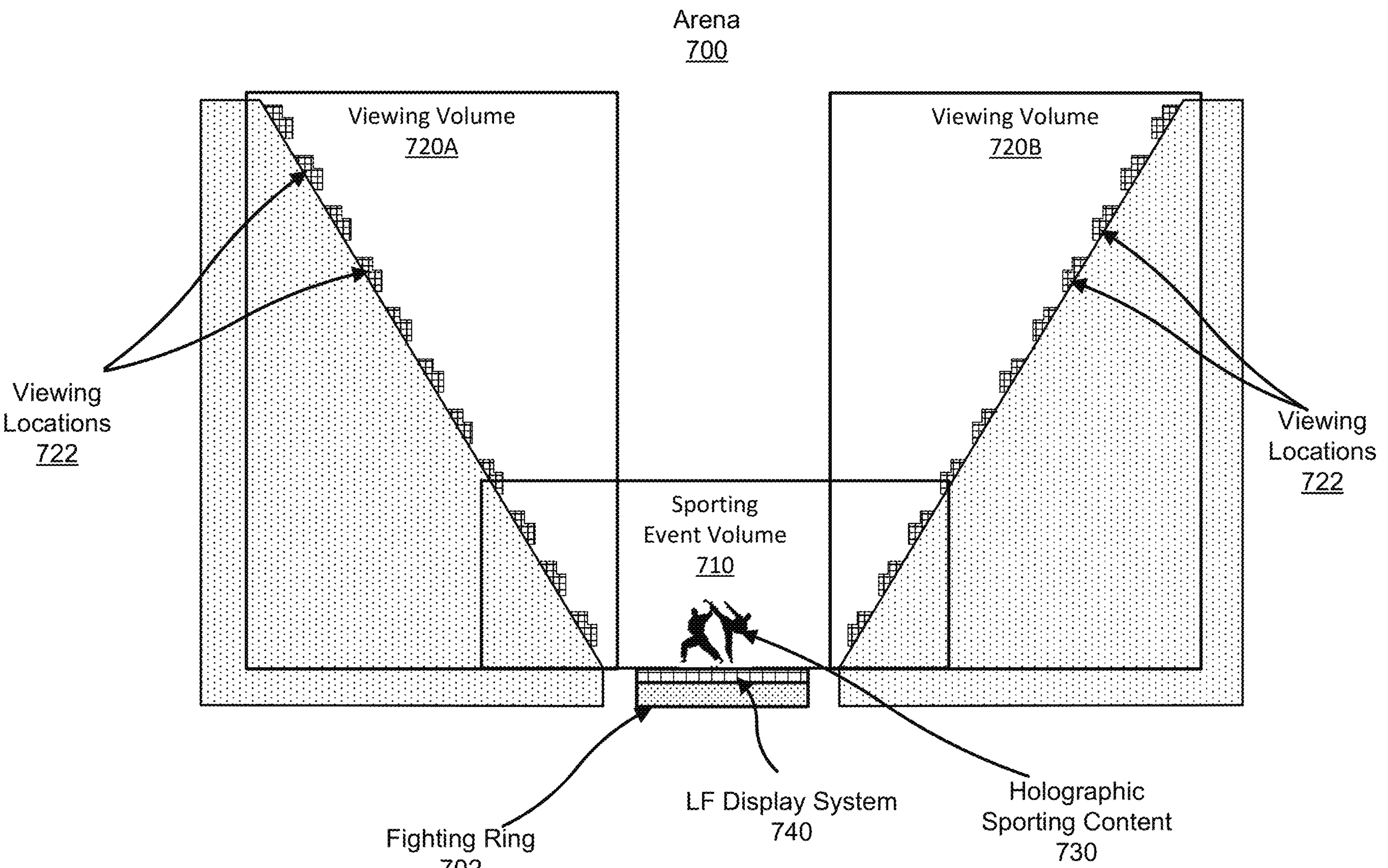
FIG. 7 illustrates a cross-section of a first venue including a LF display system for displaying a sporting event to viewers at viewing locations in viewing volumes, in accordance with one or more embodiments.

FIG. 7 illustrates a cross-section of another arena 700 including a LF display system for displaying sporting content to viewers at viewing locations in viewing volumes, in accordance with one or more embodiments. The arena 700 is designed and built to display sporting content 730 rather than augmenting an already-existing arena. As illustrated, FIG. 7 is a cross-section of arena 700. In FIG. 7, the LF display system 740 is an embodiment of the LF display system 500.

In the illustrated example, the arena 700 resembles a judo presentation space where the viewing locations 722 circle a fighting ring 702. The floor of the fighting ring 702 is covered with an array of LF display modules such that the area above the stage forms a holographic sporting event volume (e.g., sporting event volume 710). The LF display 740 presents sporting content 730 in the holographic sporting event volume 710 such that viewers in the arena 700 may perceive the holographic sporting event content 730. In the arena 700, the viewing locations 722 are positioned with a rake such that the sightline for each viewing location allows unobstructed viewing of sporting content 730 from a viewing volume (e.g., viewing volume 720A). Here, the arena includes one viewing volume which surrounds the fighting ring 702, including viewing volumes 720A and 720B, such that all the viewers are presented with the same sporting event. In other configurations there may be more than one viewing volume.

More generally, the LF display system may have a display surface that is substantially horizontal, or approximately horizontal. In several examples, the LF display system may include a display surface that is (i) at least some part of the floor of the arena, (ii) at least some part of a fighting ring (e.g., fighting ring 702), gymnastics floor, tennis court, field, or other sporting event surface in an arena and/or (iii) at least some portion of a raised viewing platform in an arena. Other types of horizontal surfaces are also possible. For these configurations, the viewers may be elevated relative to the display surface and look downward to view the holographic sporting content that is projected from the display surface, and the viewers may partially or fully surround the display surface. There are many other configurations for a light field display surface, including a vertically-mounted display surface with viewing locations that are arrayed approximately in front of the LF display surface and is described elsewhere in this disclosure (450A shown in FIG. 4C, 450B shown in FIG. 4D, and 450C shown in FIG. 4E), as well as a curved LF display surface.

The holographic sporting event volume 710 is illustrated as a bounded square for clarity, but the holographic sporting event volume 710 may only be a portion of the actual sporting event volume where holographic sporting event objects may be projected. For example, the holographic sporting event volume 710 may extend further towards the top of the arena 700. Additionally, a portion of the sporting event volume 710 and viewing volume 720 (e.g. 720A and 720B) overlap spatially. While illustrated as a partial overlap, the holographic sporting event volume and viewing volume may wholly overlap spatially. The spatial overlap are areas in which viewers may interact with holographic sporting content 730 as previously described.

Figure 8:
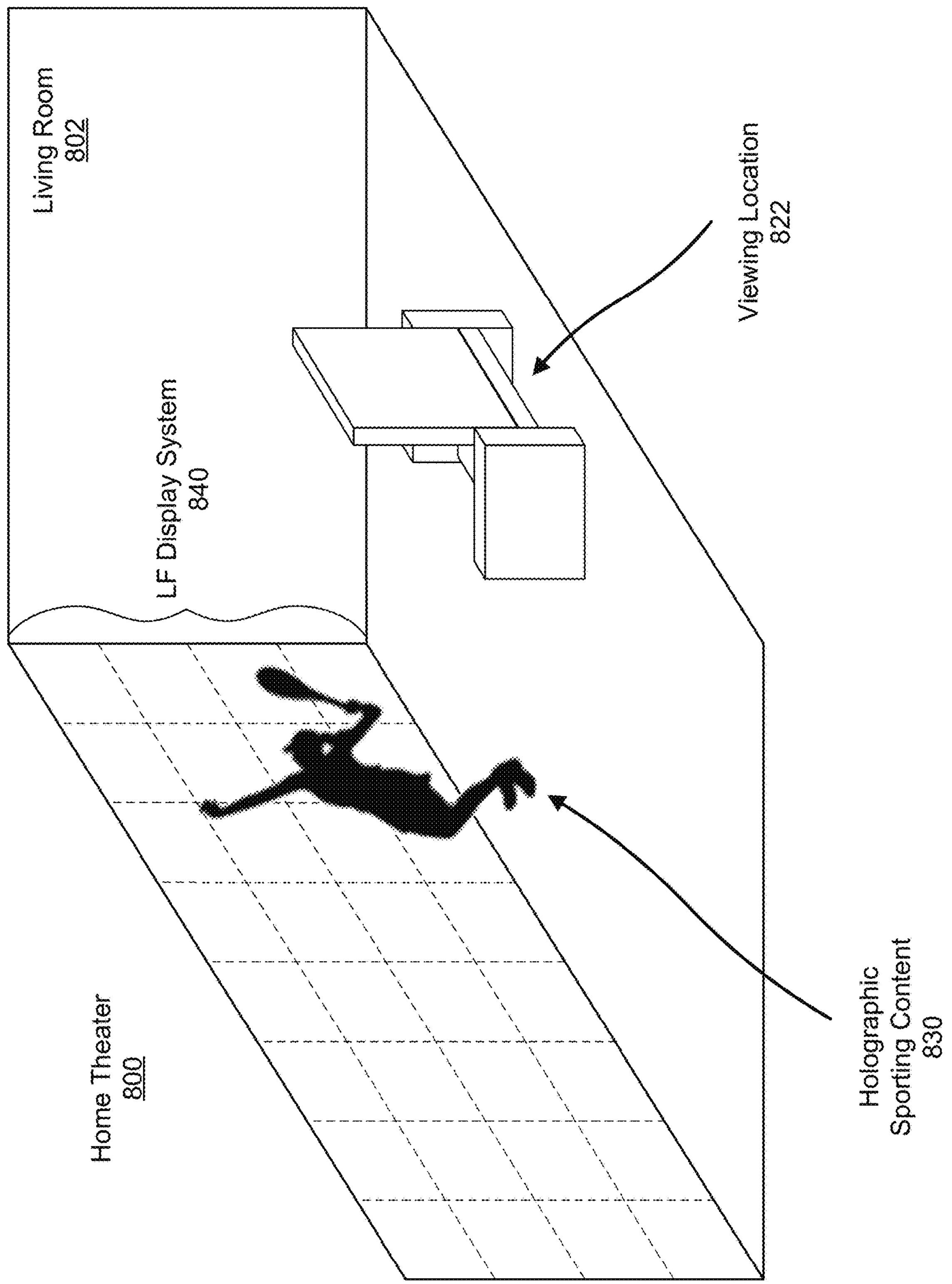
FIG. 8 illustrates a venue that also acts as a home theater in the living room of a viewer, in accordance with one or more embodiments.

A presentation space can also be a much smaller location. For example, FIG. 8 illustrates a presentation space that also acts as a home theater 800 in the living room 802 of a viewer, in accordance with one or more embodiments. Here, the home theater includes a LF display system 840 comprised of an array of LF display modules on one wall. In FIG. 8, the LF display system 840 is an embodiment of the LF display system 500.

The LF display system 840 may be configured such that the sporting event volume (e.g., holographic object volume 255) and the viewing volume wholly overlap within the living room 802. That is, at any viewing location (e.g., viewing location 822) within the living room 802 a viewer may view and interact with sporting content 830. While the viewing location 822 is illustrated as a chair, a viewer may move through the living room and view the sporting content 830. That is, the viewing location 822 may be the location of the viewer in the living room 802.

In some embodiments, the LF display system 840 creates (or modifies) sporting content 830 based on viewer interactions with the holographic sporting content 830. For example, a viewer can fist-bump a performer in the holographic sporting content 830. In this situation, a viewer may interact with a cheerleader and move his hand as if to high-five the cheerleader in the holographic sporting content 830. The tracking system (e.g., tracking system 580) monitors the viewer and identifies (e.g., via machine hearing, machine vision, neural networks, etc.) that the viewer wishes to fist-bump the performer in the holographic sporting content 830. The content generation system (e.g., content generation 530) creates (e.g., using machine learning, neural networks, or some combination thereof) holographic sporting content representing the cheerleader reciprocating the high-five based using the monitored viewer information. The tracking system 580 monitors the position of the viewer's hand and when the viewers hand and cheerleaders hand spatially overlap, the sensory feedback assembly (e.g., sensor feedback assembly 570) creates a sensation for the viewer that he has high-fived the performer in the holographic sporting content 830. This may be accomplished with a focused ultrasonic projection system which generates a volumetric tactile surface which generates the sensation of a high-five being returned to the viewer. In an embodiment, the ultrasonic projection system is integrated into the LF display system as a dual energy display surface, as previously described.

In some cases, the viewer may interact with network system (e.g., network system 556) to procure sporting content 830 for their living room 802. Continuing the example described in regard to FIG. 6, and referring to the LF sporting event distribution network shown in FIG. 5B, a viewer may send a transaction fee to network system 556 and the LF generation system 554 sends the presentation space 800 the holographic sporting content 830 of the tennis match being played in London.

Figure 9:
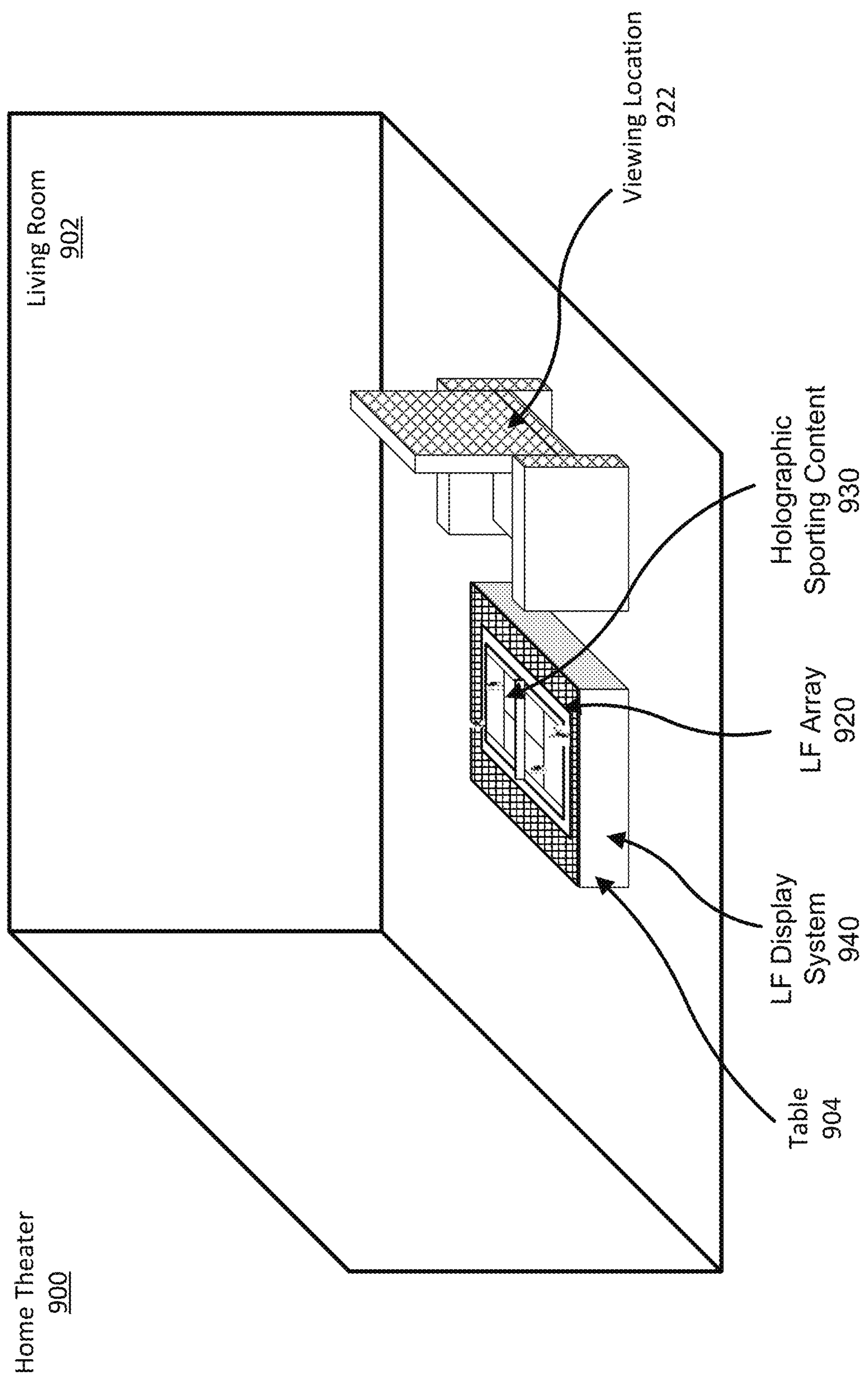
FIG. 9 is a flow diagram illustrating a method for displaying holographic content of a sporting event within a LF sporting event distribution network.

FIG. 9 illustrates a home theater 900 in the living room 902 of a viewer, in accordance with one or more embodiments. Here, the home theater includes a LF display system 940 built into a table 904, with an array of LF display modules ("LF array") on the top surface of the table 904. While the illustrated home theater is built into a table, it could be built into any other element of a living room having a surface. The LF array 920 is configured to present holographic sporting content 930 to viewers in viewing locations that can view the top surface of the table 904. In the illustrated example, an example viewing location 922 is a chair positioned such that a viewer sitting in the chair can perceive holographic content presented by the LF array 920. As previously described, viewers in other viewing locations may also perceive the holographic sporting content 930 presented by the LF array 920. In FIG. 10, the LF array 920 is an embodiment of the LF display assembly 510. Further, the LF display system 940 is an embodiment of the LF display system 500.

The LF array 920 presents holographic sporting content 930 of a sporting event such that it appears on the top surface of the table 904. A viewer in the viewing location 922 may be able to perceive and interact with the presented holographic content 930. In this example, the LF display system inputs holographic content from a network system 556, converts the holographic content for display on the top of the table 904, and presents the holographic content 930 to viewers in one or more viewing volumes of the LF display system 940.

In some embodiments, a viewer can interact with the LF display system to change the presented holographic sporting content 930. For example, the LF display system can be configured to receive auditory cues, visual cues, etc. and change the holographic content 930 in response. As an illustration, a viewer in the living room 902 can state "Pause Match," the LF display system records the audio, recognizes the audio, and pauses playback of the holographic sporting content 930 in response. Similarly, a viewer in the living room 902 can interact with the holographic content 930 to rotate the view displayed by the table. As an illustration, a viewer can touch a player in the presented holographic content 930 with one hand and make a rotation gesture with the other hand. In this case, the LF display system captures an image of the viewer making the gesture, recognizes the gesture, and rotates the holographic content in response.

IV. Displaying Sporting Event Content to Viewers in an Arena

Figure 10:
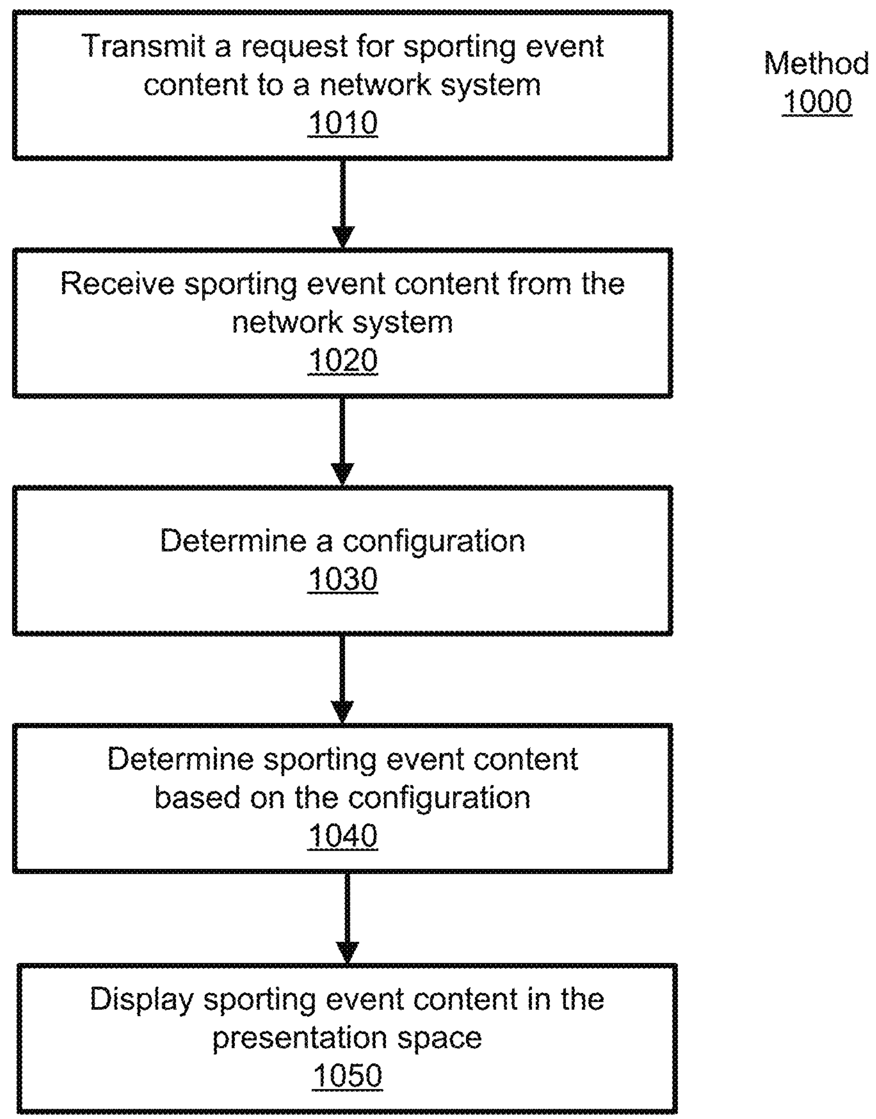
FIG. 10 a process flow diagram illustrating a method for displaying a holographic.

FIG. 10 is a flow diagram of a method 1000 for displaying holographic content to viewers in a sports event presentation space (e.g., arena 600) in the context of a LF sports network (e.g., LF sports network 550). The method 1000 may include additional or fewer steps and the steps may occur in a different order. Further, various steps, or combinations of steps, can be repeated any number of times during execution of the method.

To begin, an arena including a LF display system (e.g., LF display system 500) transmits 1010 a request for a live-stream (or previously recorded) of holographic sporting event content (e.g., holographic sporting event content 630) to a network system (e.g., network system 556) system via a network (e.g., network 552). The request may include a transaction fee sufficient for payment to display the holographic sporting event content.

A LF generation system (e.g., LF generation system 554) records the LF data of a live sporting event and transmits the corresponding holographic sporting event content to the network system. The network system transmits the holographic sporting event content to the LF display system such that it can be displayed at approximately the same time as it is being recorded by the LF generation system. In other embodiments, the network system (e.g. network system 556) may transmit pre-recorded holographic sporting event content.

The LF display system receives 1020 the holographic sporting event content from the network system via the network.

The LF display system determines 1030 a configuration of the LF display system and/or the presentation space in the arena. For example, the LF display system may access a configuration file including a number of parameters describing the HW configuration of the LF display, including the resolution, projected rays per degree, fields-of-view, deflection angles on the display surface, or a dimensionality of the LF display surface. The configuration file may also contain information about the geometrical orientation of the LF display assembly, including the number of LF display panels, relative orientation, width, height, and the layout of the LF display panels. Further, the configuration file may contain configuration parameters of the performance venue, including holographic object volumes, viewing volumes, and a location of the audience relative to the display panels.

To illustrate through an example, the LF display system determines 1030 viewing volumes (e.g., viewing volume 620A, 620B, and 620C) for displaying the holographic sporting event content. For example, the LF display system 500 may access information in the LF display system describing the layout, geometric configuration, and/or hardware configuration of the presentation space (e.g., arena 600). To illustrate, the layout may include the locations, separations, and sizes of viewing locations (e.g., viewing locations 622) in the presentation space. As such, LF display system may determine that viewing locations in the first tier of the presentation space are in a first viewing volume, viewing locations in the second tier of the venue are in a second viewing volume, and viewing locations in the third tier of the venue are in a third viewing volume. In various other embodiments, a LF display system may determine any number and configuration of viewing volumes at any location within a venue.

The LF display system generates 1040 the holographic content (and other sensory content) for presenting on the LF display system, based on the hardware configuration of the LF display system within the performance venue, and the particular layout and configuration of the presentation space. Determining the holographic sporting event content for display can include appropriately rendering the holographic sporting event content for the presentation space or viewing volumes. For example, the LF display system may: (i) augment the holographic sporting event content for display to the viewing volume in the third tier with an advertisement and remove aspects of the live performance from the holographic sporting event content, (ii) decrease the fidelity of the holographic sporting event content for display to the viewing volume in the second tier of the presentation space, and (iii) fully render holographic sporting event content for display to the viewing volume in the third tier of the presentation space.

The LF display system presents 1050 the holographic sporting event content in the holographic sporting event volume of the presentation space such that viewers at viewing locations in each viewing volume perceive the appropriate holographic sporting event content. That is, viewers in the top viewing volume perceive the holographic sporting event content with an advertisement, viewers in the middle viewing volume perceive the holographic sporting event content at lower resolution, and viewers in the bottom viewing volume perceive the fully rendered holographic sporting event content.

The LF display system may determine information about viewers in the viewing volumes while the viewers view the holographic sporting event content at any time. For example, the tracking system may monitor the facial responses of viewers in the viewing volumes and the viewer profiling system may access information regarding characteristics of the viewers in the viewing volumes.

The LF display system may create (or modify) holographic sporting event content for concurrent display based on the determined information. For example, the LF processing engine may create a light show for concurrent display by the LF display system based on determined information that the viewers enjoy fireworks or electronic music festivals.

V. Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A light field (LF) sports content network system comprising:

a light field recording assembly configured to record one or more types of energy representing a sporting event at a sporting arena;

a processing engine configured to convert the recorded energy into a holographic content livestream representing the sporting event;

a network interface configured to transmit the holographic content livestream to one or more LF display systems via a network;

one or more pressure sensors configured to record mechanical energy; and wherein the holographic content livestream includes instructions to generate mechanical energy to produce one or more tactile surfaces.

2. The LF sports content network system of claim 1, wherein the processing engine is configured to add additional content to the holographic content livestream.

3. The LF sports content network system of claim 1, wherein the processing engine comprises an encoder to encode the holographic content livestream to an encoded holographic content livestream, and the encoded holographic content livestream is transmitted via the network interface.

4. The LF sports content network system of claim 1, wherein:

the network interface transmits the holographic content livestream to a local holographic content distribution hub, and the local holographic content distribution hub transmits the holographic content livestream to at least one LF display system of the one or more LF display systems.

5. The LF sports content network system of claim 1, wherein:

the processing engine is configured to receive a geometric orientation of a LF display system of the one or more LF display systems; and the processing engine transmits the holographic content livestream to the LF display system via the network such that the holographic content livestream is presentable by the LF display system, and wherein the holographic content livestream includes holographic content based on the geometric orientation of the LF display.

6. The LF sports content network system of claim 1, wherein:

the processing engine is configured to determine a configuration of the sporting arena; and the processing engine transmits the holographic content livestream to the LF display system via the network such that the holographic content livestream is presentable by the LF display system, and wherein the holographic content livestream includes holographic content based on the configuration of the sporting arena.

7. A light field (LF) display system comprising:

a network interface configured to receive an encoded livestream comprising real-time holographic content of a sporting event via a network;

a LF processing engine configured to decode the encoded holographic livestream into a decoded livestream;

a LF display assembly configured to present the decoded livestream to an audience, the decoded livestream comprising the real-time holographic content of the sporting event; and wherein the presented holographic content includes a first type of energy and a second type of energy.

8. The LF display system of claim 7, wherein the encoded livestream is in a first format and the decoded livestream is in a second format.

9. The LF display system of claim 7, wherein the LF processing engine employs a proprietary codec to decode the encoded streaming holographic content.

10. The LF display system of claim 7, wherein the holographic content is encoded in a format that is decodable by a proprietary codec.

11. The LF display system of claim 7, wherein:

the LF processing engine is configured to receive a hardware configuration of the LF display assembly; and the LF processing engine decodes the encoded livestream based on the hardware configuration of the LF display assembly such that the decoded livestream is presentable by the LF display assembly.

12. The LF display system of claim 7, wherein:

the LF processing engine is configured to receive a geometric orientation of the LF display assembly; and the LF processing engine decodes the encoded livestream based on the geometric orientation of the LF display assembly such that the decoded livestream is presentable by the LF display assembly.

13. The LF display system of claim 7, wherein:

the LF display assembly is located in a sporting event presentation space;

the LF processing engine is configured to determine a configuration of the sporting event presentation space; and the LF processing engine decodes the encoded livestream based on the configuration of the sporting event presentation space.

14. The LF display system of claim 7, wherein the first type of energy is electromagnetic energy and the second type of energy is ultrasonic energy.

15. The LF display system of claim 7, wherein the processing engine is configured to add additional content to the real-time holographic content of the sporting event.

16. The LF display system of claim 15, wherein the additional content is additional holographic content, the additional holographic content presented simultaneously as the holographic content livestream by a LF display system.

17. The LF display system of claim 15, wherein the additional content is an advertisement, the advertisement presented simultaneously as the holographic content livestream.

18. A light field (LF) sports display system comprising:

a presentation location;

a LF processing engine configured to receive and present a holographic content livestream for presentation in the presentation location, the holographic content livestream comprising holographic content representing a sporting event occurring in a sporting arena;

a LF display assembly configured to present the holographic content livestream to an audience in the presentation location; and wherein the presented holographic content of the holographic content livestream includes a first type of energy and a second type of energy.

19. The LF sports display system of claim 18, wherein the sporting event is one of:

a baseball game,
a basketball game,
a hockey game,
a curling match,
a gymnastics event,
a cricket match,
a chess match,
a field hockey game,
a table tennis game,
a rugby match,
a golf game,
a track and field meet,
a football game,
a soccer game,
a car racing event,
a tennis match,
a boxing match,
a martial arts bout,
an Olympics event, and
a world championship event.

20. The LF sports display system of claim 18, wherein the sporting arena is any of:

a stadium,
a field,
an arena,
a court,
a gymnasium, and
an amphitheater.

21. The LF sports display system of claim 18, wherein the presentation location is any of:

a stadium,
an arena,
a court,
a gymnasium,
an amphitheater,
a bar,
a home entertainment system,
a table-top presentation system, and
a public presentation system.

22. The LF sports display system of claim 18, wherein:

the LF processing engine is configured to determine a hardware configuration of the LF display assembly; and the LF processing engine presents the holographic content according to the hardware configuration of the LF display assembly.

23. The LF sports display system of claim 18, wherein:

the LF processing engine is configured to determine a geometric orientation of the LF display assembly; and the LF processing engine presents the holographic content according to the geometric orientation of the LF display assembly.

24. The LF sports display system of claim 18, wherein:

the LF processing engine is configured to determine a configuration of the sporting arena; and the LF processing engine presents the holographic content according to the configuration of the sporting arena.

25. The LF sports display system of claim 18, wherein:

the LF processing engine is configured to determine a configuration of the presentation location; and the LF processing engine presents the holographic content according to the configuration of the presentation location.

26. The LF sports display system of claim 18, wherein the holographic content is encoded using a proprietary codec, and the processing engine is configured to decode the holographic content using the proprietary codec.

27. The LF display system of claim 18, wherein the first type of energy is electromagnetic energy and the second type of energy is ultrasonic energy.

28. The LF display system of claim 27, wherein the first type of energy and second type of energy are presented at the same location such that the LF display assembly presents a volumetric tactile surface.

29. The LF sports display system of claim 18, wherein the LF sports display system receives the holographic content livestream in response to transmitting a transaction fee for the holographic content livestream.

* * * * *